US011361560B2

(12) United States Patent
Tahara et al.

(10) Patent No.: US 11,361,560 B2
(45) Date of Patent: Jun. 14, 2022

(54) PASSENGER STATE DETECTION DEVICE, PASSENGER STATE DETECTION SYSTEM, AND PASSENGER STATE DETECTION METHOD

(71) Applicant: Mitsubishi Electric Corporation, Tokyo (JP)

(72) Inventors: Natsuki Tahara, Tokyo (JP); Shintaro Watanabe, Tokyo (JP); Masanobu Osawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 6 days.

(21) Appl. No.: 16/965,737

(22) PCT Filed: Feb. 19, 2018

(86) PCT No.: PCT/JP2018/005766
§ 371 (c)(1),
(2) Date: Jul. 29, 2020

(87) PCT Pub. No.: WO2019/159364
PCT Pub. Date: Aug. 22, 2019

(65) Prior Publication Data
US 2021/0034887 A1    Feb. 4, 2021

(51) Int. Cl.
*G06V 20/59*    (2022.01)
*G06V 10/98*    (2022.01)
(Continued)

(52) U.S. Cl.
CPC ............. *G06V 20/59* (2022.01); *G06V 10/98* (2022.01); *G06V 40/16* (2022.01); *G06V 40/18* (2022.01)

(58) Field of Classification Search
None
See application file for complete search history.

(56) References Cited

U.S. PATENT DOCUMENTS 10,735,664 B2 *  8/2020  Kunihiro ............ G06K 9/00845
11,093,768 B2 *  8/2021  Konabe .............. H04N 5/23219
(Continued)

FOREIGN PATENT DOCUMENTS

JP    2010-49491 A    3/2010
JP    2012-228931 A    11/2012
JP    2013-55712 A    3/2013

OTHER PUBLICATIONS

German Office Action dated May 20, 2021 in corresponding German Application No. 11 2018 006 886.2 with an English Translation.

*Primary Examiner* — Emily C Terrell
*Assistant Examiner* — Nathan J Bloom
(74) *Attorney, Agent, or Firm* — Birch, Stewart, Kolasch & Birch, LLP

(57) ABSTRACT

A passenger state detection device (100) includes: a correction parameter setting unit (30) for setting a correction parameter for a captured image captured by a camera (2) for capturing a vehicle interior for each of detection items in passenger state detecting process including the multiple detection items using at least one of a feature amount in a face part area that corresponds to a passenger's face part in the captured image or a feature amount in a structure area that corresponds to a structure in the vehicle interior in the captured image; and an image correcting unit (40) for correcting the captured image for each of the detection items in the passenger state detecting process using the correction parameter set by the correction parameter setting unit (30).

8 Claims, 21 Drawing Sheets

(51) Int. Cl.
*G06V 40/18* (2022.01)
*G06V 40/16* (2022.01)

(56) References Cited

U.S. PATENT DOCUMENTS

| | | | |
|---|---|---|---|
| 2008/0037837 A1* | 2/2008 | Noguchi | G06K 9/00832 |
| | | | 382/118 |
| 2008/0186701 A1* | 8/2008 | Omi | G06K 9/2027 |
| | | | 362/231 |
| 2009/0309994 A1 | 12/2009 | Inoue | |
| 2013/0073114 A1* | 3/2013 | Nemat-Nasser | B60R 25/25 |
| | | | 701/1 |
| 2014/0139655 A1* | 5/2014 | Mimar | G08B 21/0476 |
| | | | 348/77 |
| 2017/0132459 A1* | 5/2017 | Sunkavalli | G06V 40/172 |
| 2020/0134336 A1* | 4/2020 | Kogure | G06F 3/013 |
| 2020/0216095 A1* | 7/2020 | Isozaki | H04W 4/40 |
| 2021/0197856 A1* | 7/2021 | Hoshina | G06K 9/00382 |

* cited by examiner

FIG. 5A
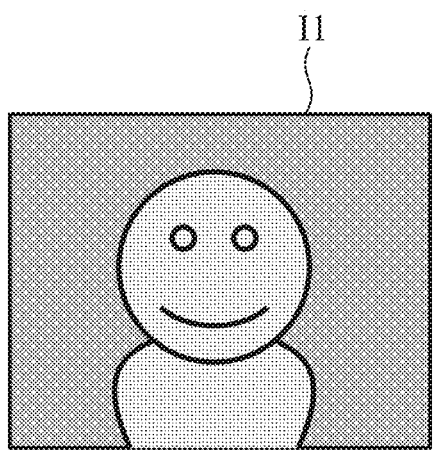
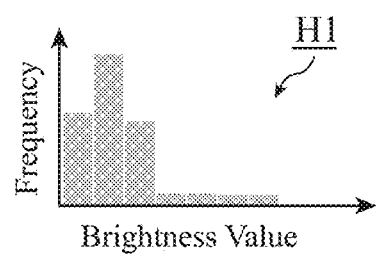
FIG. 5B
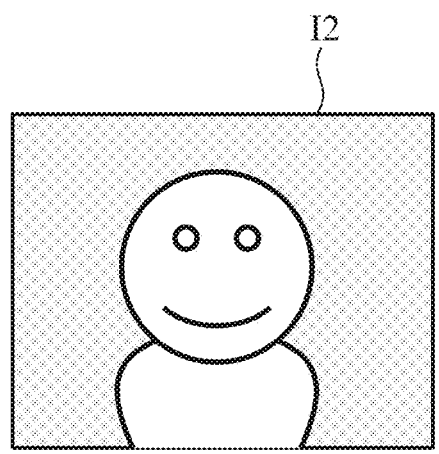
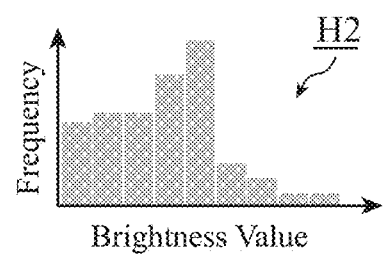

FIG. 11A

| Reference Color Feature Amount | Iris Area | Skin Area |
|---|---|---|
| Reference Color Feature Amount | First Reference RGB Values RGB(30,30,30) | Second Reference RGB Values RGB(255,226,196) |
| Color Feature Amount before Correction | RGB(30,22,22) | RGB(255,170,147) |
| Color Feature Amount after Correction | RGB(30,28,28) | RGB(255,221,191) |

FIG. 11B

| Reference Color Feature Amount | Iris Area | Skin Area |
|---|---|---|
| Reference Color Feature Amount | First Reference RGB Values RGB(30,30,30) | Second Reference RGB Values RGB(255,226,196) |
| Color Feature Amount before Correction | RGB(30,22,22) | RGB(255,153,132) |
| Color Feature Amount after Correction | RGB(30,28,28) | RGB(255,199,172) |

PASSENGER STATE DETECTION DEVICE, PASSENGER STATE DETECTION SYSTEM, AND PASSENGER STATE DETECTION METHOD

TECHNICAL FIELD

The present invention relates to a passenger state detection device, a passenger state detection system, and a passenger state detection method.

BACKGROUND ART

In the related art, technology has been developed which corrects a captured image using a correction parameter that is set on the basis of a feature amount of the image captured by a camera. For example, Patent Literature 1 discloses technology of correcting the gradation of a captured image using a correction parameter that is set on the basis of a brightness value of the captured image by a camera.

CITATION LIST

Patent Literature

Patent Literature 1: JP 2013-55712 A

SUMMARY OF INVENTION

Technical Problem

In the related art, technology has been developed for detecting a passenger's state through execution of an image recognition process on an image captured by a camera for capturing images of the interior of a vehicle. Specifically, for example, technology has been developed which detects the line of sight, the mouth-opening degree, the face orientation, the complexion, and the eye-opening degree of a passenger. That is, the detection process of the state of a passenger (hereinafter referred to as "passenger state detecting process") includes a plurality of detection items (such as the line of sight, the mouth-opening degree, the face orientation, the complexion, and the eye-opening degree).

Here, in the passenger state detecting process including the multiple detection items, appropriate correction parameters are different for each detection item. In contrast, conventional image correction technology as described in Patent Literature 1 (hereinafter simply referred to as "conventional image correction technology") does not set a correction parameter for each detection item in the passenger state detecting process. For this reason, there is a disadvantage that in a case where the passenger state detecting process includes a plurality of detection items, the accuracy of the passenger state detecting process cannot be sufficiently improved even if the conventional image correction technology is used.

The present invention has been made to solve the disadvantage as described above, and an object of the present invention is to improve the accuracy of the passenger state detecting process including a plurality of detection items.

Solution to Problem

A passenger state detection device according to the present invention includes: processing circuitry configured to set a correction parameter for a captured image, captured by a camera for capturing a vehicle interior, for each of multiple detection items in a passenger state detecting process including the multiple detection items using at least one of a feature amount in a face part area corresponding to a passenger's face part in the captured image or a feature amount in a structure area that corresponds to a structure in the vehicle interior in the captured image, and correct the captured image for each of the detection items in the passenger state detecting process using the set correction parameter.

Advantageous Effects of Invention

According to the present invention, the configuration as described above allows the accuracy of the passenger state detecting process including a plurality of detection items to be improved.

BRIEF DESCRIPTION OF DRAWINGS

FIG. 5A is an explanatory diagram illustrating an example of a captured image and a histogram illustrating a distribution of brightness values in the captured image. FIG. 5B is an explanatory diagram illustrating an example of a reference image and a histogram illustrating a distribution of brightness values in the reference image.

FIG. 11A is a table illustrating an example of the reference color feature amount, the color feature amount before correction, and the color feature amount after correction in each of an iris area and a skin area when a passenger's complexion is in a normal state. FIG. 11B is a table illustrating an example of the reference color feature amount, the color feature amount before correction, and the color feature amount after correction in each of an iris area and a skin area when a passenger's complexion is in an abnormal state.

DESCRIPTION OF EMBODIMENTS

To describe the present invention further in detail, embodiments for carrying out the present invention will be described below with reference to the accompanying drawings.

First Embodiment

Figure 1:
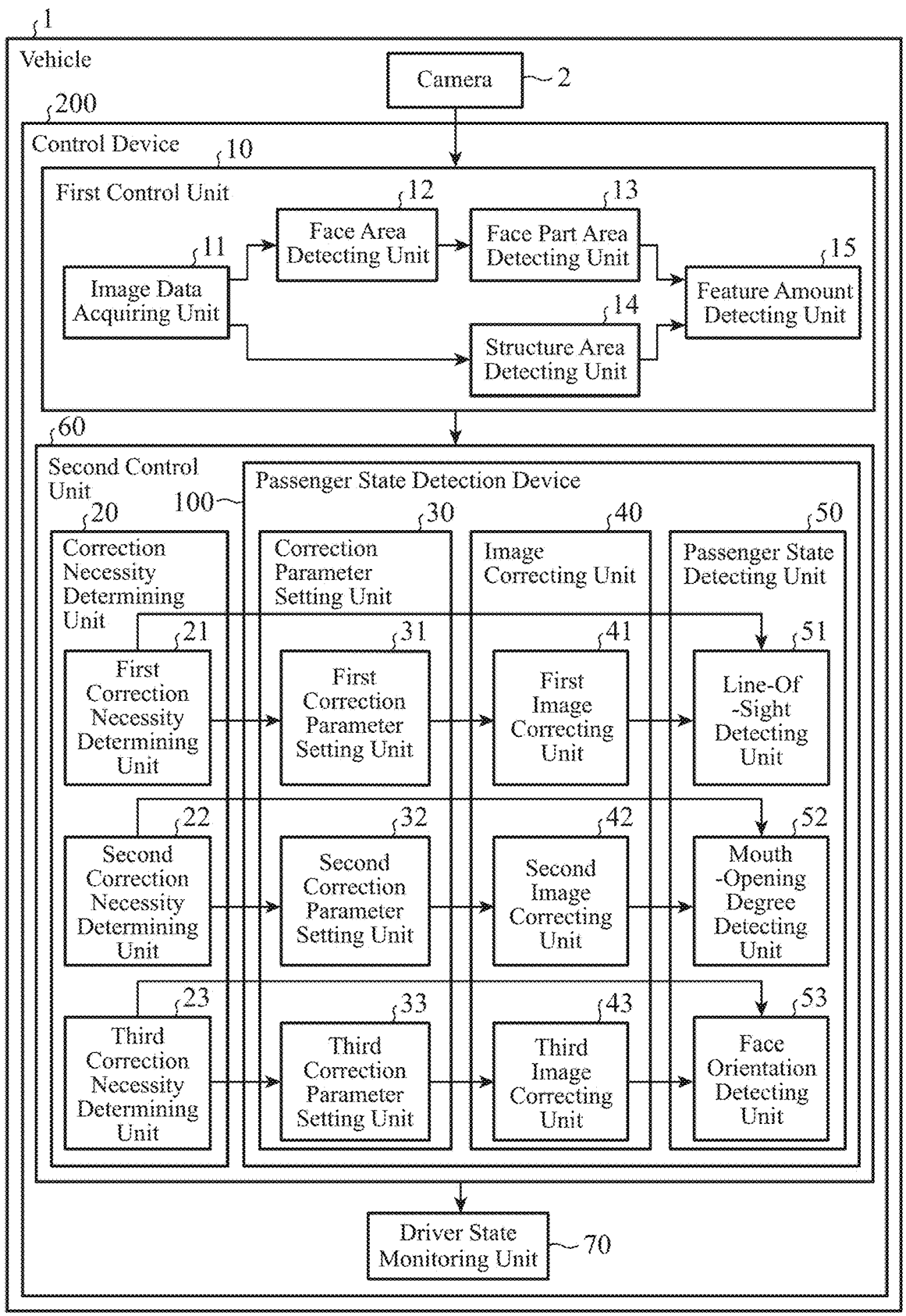
FIG. 1 is a block diagram illustrating the main part of a control device including a passenger state detection device according to a first embodiment.

FIG. 1 is a block diagram illustrating the main part of a control device including a passenger state detection device according to a first embodiment. With reference to FIG. 1, a passenger state detection device 100 according to the first embodiment will be described focusing on an example in which the passenger state detection device 100 is included in a control device 200 in a vehicle 1.

The vehicle 1 includes a camera 2 for imaging the vehicle interior. The camera 2 is arranged in a front part of the interior of the vehicle 1 and captures an image over a range including the face of a passenger of the vehicle 1 (for example, a driver of the vehicle 1) from the front. Hereinafter, a passenger of the vehicle 1 is simply referred to as "passenger."

The camera 2 may include, for example, one visible light camera, a plurality of visible light cameras, one infrared camera, or a plurality of infrared cameras. In a case where the camera 2 includes an infrared camera, a light source (not illustrated) for emitting infrared rays for imaging to a range including the passenger's face is provided. This light source includes, for example, a light emitting diode (LED).

An image data acquiring unit 11 acquires, from the camera 2, image data (hereinafter referred to as "captured image data") indicating an image captured by the camera 2 (hereinafter, simply referred to as "captured image"). The image data acquiring unit 11 outputs the acquired captured image data to a face area detecting unit 12 and a structure area detecting unit 14.

The face area detecting unit 12 detects an area that corresponds to a passenger's face (hereinafter referred to as "face area") in the captured image using the captured image data output by the image data acquiring unit 11. Specifically, for example, the face area detecting unit 12 includes an identifier including a combination of a Haar-like detector and AdaBoost, Cascade, or the like and detects the face area using these algorithms. The face area detecting unit 12 outputs image data corresponding to the detected face area (hereinafter referred to as "face image data") to a face part area detecting unit 13.

The face part area detecting unit 13 detects an area corresponding to the passenger's face parts (hereinafter referred to as "face part area") of the face area using the face image data output from the face area detecting unit 12. The face part area includes a plurality of areas corresponding to a plurality of face parts.

For example, the face part area includes areas corresponding to the passenger's eyes, an area corresponding to the passenger's nose, an area corresponding to the passenger's mouth, areas corresponding to the passenger's cheeks, an area corresponding to the passenger's chin, an area corresponding to the passenger's forehead, and the like. The areas corresponding to the passenger's eyes include, for example, areas corresponding to the passenger's irises, areas corresponding to the passenger's outer corners of the eyes, areas corresponding to the passenger's inner corners of the eyes, areas corresponding to the passenger's eyelids, and so on. The area corresponding to the passenger's mouth includes, for example, an area corresponding to the passenger's corners of the mouth, an area corresponding to the passenger's lips, and the like. Of these areas, areas such the area corresponding to the passenger's nose, the areas corresponding to the passenger's cheeks, the area corresponding to the passenger's chin, the area corresponding to the passenger's forehead, and the areas corresponding to the passenger's eyelids correspond to the skin of the passenger.

An algorithm such as model fitting or elastic bunch graph matching (EBGM) is used for detection of the face part area. The face part area detecting unit 13 outputs image data (hereinafter referred to as "face part image data") corresponding to the detected face part area to a feature amount detecting unit 15.

The structure area detecting unit 14 detects an area corresponding to a structure in the interior of the vehicle 1 (hereinafter, simply referred to as "structure") in the captured image (hereinafter referred to as "structure area") using the captured image data output by the image data acquiring unit 11. Specifically, for example, the structure area detecting unit 14 detects an area corresponding to the ceiling of the vehicle 1, areas corresponding to pillars of the vehicle 1, and the like. The structure area detecting unit 14 outputs image data corresponding to the detected structure area (hereinafter referred to as "structure image data") to the feature amount detecting unit 15.

The feature amount detecting unit 15 detects a feature amount in the face part area using the face part image data output by the face part area detecting unit 13. Specifically, for example, the feature amount detecting unit 15 detects the feature amount based on brightness (hereinafter referred to as "brightness feature amount") by calculating the average value, the maximum value, a pixel differential value, or the like of brightness values in each of the multiple areas included in the face part area.

The feature amount detecting unit 15 also detects the feature amount in the structure area using the structure image data output by the structure area detecting unit 14. Specifically, for example, the feature amount detecting unit 15 detects the brightness feature amount by calculating the average value, the maximum value, a pixel differential value, or the like of brightness values in the structure area.

The image data acquiring unit 11, the face area detecting unit 12, the face part area detecting unit 13, the structure area detecting unit 14, and the feature amount detecting unit 15 are included in a first control unit 10. The first control unit 10 has a function of appropriately outputting, to each unit in a second control unit 60, each of the captured image data, the face image data, the face part area data, the structure image data, and information indicating the feature amount detected by the feature amount detecting unit 15 (hereinafter referred to as "feature amount information"). The second control unit 60 executes the following processes using these pieces of image data and the feature amount information.

A first correction necessity determining unit 21 determines the necessity of correction of the captured image in a detection process of the passenger's line of sight (hereinafter referred to as "line-of-sight detecting process") using the feature amount detected by the feature amount detecting unit 15.

Specifically, for example, the first correction necessity determining unit 21 determines the necessity of correction of the captured image using the brightness feature amount in the face part area. In other words, the first correction necessity determining unit 21 uses the feature amount information to calculate a differential value between a brightness value in the areas corresponding to the passenger's irises (hereinafter referred to as "iris areas") and a brightness value in the areas corresponding to the passenger's eyelids (hereinafter referred to as "eyelid areas"). The first correction necessity determining unit 21 calculates a differential value $\Delta L1$ between the calculated differential value and a predetermined reference value Lref1. The reference value Lref1 is set on the basis of the brightness difference between the iris areas and the eyelid areas necessary for appropriate execution of the line-of-sight detecting process.

As an example, in a case where the brightness value in the iris areas is 10 and the brightness value in the eyelid areas is 50, the differential value between these brightness values is 40. At this point, in a case where the reference value Lref1 is set to 100, the differential value $\Delta L1$ is 60.

The first correction necessity determining unit 21 compares the calculated differential value $\Delta L1$ with a predetermined threshold value Lth1. In a case where the differential value $\Delta L1$ is greater than or equal to the threshold value Lth1, the first correction necessity determining unit 21 determines that the captured image needs to be corrected in the line-of-sight detecting process. On the other hand, in a case where the differential value $\Delta L1$ is less than the threshold value Lth1, the first correction necessity determining unit 21 determines that the captured image does not need to be corrected in the line-of-sight detecting process.

Alternatively, for example, the first correction necessity determining unit 21 determines the necessity of correction of the captured image using the brightness feature amount in the structure area. That is, the first correction necessity determining unit 21 uses the feature amount information to calculate a differential value $\Delta L2$ between the brightness value in the area corresponding to the ceiling of the vehicle 1 (hereinafter referred to as "ceiling area") and a predetermined reference value Lref2. The reference value Lref2 is set on the basis of the brightness of the ceiling area suitable for the line-of-sight detecting process, that is, the brightness of the ceiling area in a case where the image of the areas corresponding to the passenger's eyes (hereinafter referred to as "eye areas") becomes stable. The reference value Lref2 is set to, for example, 80.

The first correction necessity determining unit 21 compares the calculated differential value $\Delta L2$ with a predetermined threshold value Lth2. When the differential value $\Delta L2$ is larger than or equal to the threshold value Lth2, the first correction necessity determining unit 21 determines that the captured image needs to be corrected in the line-of-sight detecting process. On the other hand, when the differential value $\Delta L2$ is less than the threshold value Lth2, the first correction necessity determining unit 21 determines that the captured image does not need to be corrected in the line-of-sight detecting process.

When the first correction necessity determining unit 21 determines that the captured image needs to be corrected, a first correction parameter setting unit 31 uses the feature amount detected by the feature amount detecting unit 15 to set a correction parameter for the line-of-sight detecting process. A first image correcting unit 41 corrects the captured image indicated by the captured image data using the correction parameter set by the first correction parameter setting unit 31.

Figure 2A:
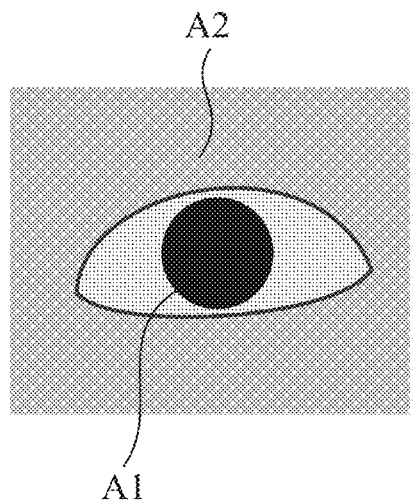
FIG. 2A is an explanatory diagram illustrating an example of brightness values in an eye area before correction in a case where a captured image for a line-of-sight detecting process is corrected.
Figure 2B:
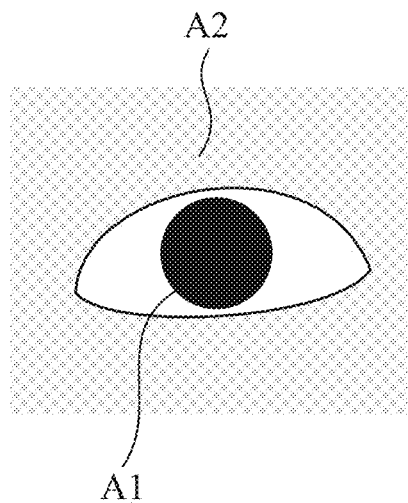
FIG. 2B is an explanatory diagram illustrating an example of brightness values in the eye area after correction in a case where a captured image for the line-of-sight detecting process is corrected.

Specifically, it is assumed for example that a brightness value in an iris area A1 indicated by the feature amount information is 10 and that a brightness value in an eyelid area A2 indicated by the feature amount information is 50 in a case where the reference value Lref1 is set to 100 (see FIG. 2A). In this case, by increasing the brightness value in the captured image by a factor of 2.5, the brightness value in the iris area A1 becomes 25 and the brightness value in the eyelid area A2 becomes 125, and thus the differential value between these brightness values becomes 100 (see FIG. 2B). That is, the brightness difference between the iris area A1 and the eyelid area A2 becomes equivalent to the reference value Lref1.

Thus, the first correction parameter setting unit 31 sets the correction parameter to "2.5." The first image correcting unit 41 performs correction to increase the brightness value in the captured image by the factor of 2.5. As a result, the brightness difference between the iris areas and the eyelid areas can be adapted for the line-of-sight detecting process.

Alternatively, let us assume for example that a brightness value in the ceiling area indicated by the feature amount information is 40 in a state where the reference value Lref2 is set to 80. In this case, by increasing the brightness value in the captured image by a factor of 2.0, the brightness value in the ceiling area becomes 80. That is, the brightness value in the ceiling area becomes equivalent to the reference value Lref2.

Thus, the first correction parameter setting unit 31 sets the correction parameter to "2.0." The first image correcting unit 41 performs correction to increase the brightness value in the captured image by the factor of 2.0. As a result, the image of the eye areas can be stabilized.

When the first correction necessity determining unit 21 determines that the captured image does not need to be corrected, a line-of-sight detecting unit 51 uses the captured image indicated by the captured image data (that is, the captured image before correction) to perform the line-of-sight detecting process. Contrarily, when the first correction necessity determining unit 21 determines that the captured image needs to be corrected, the line-of-sight detecting unit 51 performs the line-of-sight detecting process using the captured image corrected by the first image correcting unit 41.

The line-of-sight detecting process is performed by, for example, calculating the angle of the line of sight of the passenger on the basis of the positional relationship between a reference point in an eye area (e.g., a point corresponding to the inner or outer corner of the eye or the like) and a moving point with respect to the reference point (e.g., a point corresponding to the iris, the pupil, or the like). Alternatively, the line-of-sight detecting process is performed by, for example, calculating the angle of the line of sight of the passenger on the basis of the positional relationship between a reference point in an eye area (e.g., a point corresponding to a cornea reflection image, sclera reflection image, or the like) and a moving point with respect to the reference point (e.g., a point corresponding to the iris, the pupil, or the like), that is, the corneal reflection method or the sclera reflection method.

A second correction necessity determining unit 22 determines the necessity of correction of the captured image in a detection process of the passenger's mouth-opening degree (hereinafter referred to as "mouth-opening degree detecting process") using the feature amount detected by the feature amount detecting unit 15.

Specifically, for example, the second correction necessity determining unit 22 determines the necessity of correction of the captured image using the brightness feature amount in the face part area. In other words, the second correction necessity determining unit 22 uses the feature amount information to calculate a differential value between a brightness value in the areas corresponding to the passenger's lips (hereinafter referred to as "lip area") and a brightness value in the area corresponding to the passenger's chin (hereinafter referred to as "chin area"). The second correction necessity determining unit 22 calculates a differential value $\Delta L3$ between the calculated differential value and a predetermined reference value Lref3. The reference value Lref3 is set on the basis of the brightness difference between the lip area and the chin area necessary for appropriate execution of the mouth-opening degree detecting process. The reference value Lref3 is set to, for example, 80.

The second correction necessity determining unit 22 compares the calculated differential value $\Delta L3$ with a predetermined threshold value Lth3. When the differential value $\Delta L3$ is larger than or equal to the threshold value Lth3, the second correction necessity determining unit 22 determines that the captured image needs to be corrected in the mouth-opening degree detecting process. On the other hand, when the differential value $\Delta L3$ is less than the threshold value Lth3, the second correction necessity determining unit 22 determines that the captured image does not need to be corrected in the mouth-opening degree detecting process.

Alternatively, for example, the second correction necessity determining unit 22 determines the necessity of correction of the captured image using the brightness feature amount in the structure area. That is, the second correction necessity determining unit 22 uses the feature amount information to calculate a differential value $\Delta L4$ between the brightness value in the ceiling area and a predetermined reference value Lref4. The reference value Lref4 is set on the basis of the brightness of the ceiling area suitable for the mouth-opening degree detecting process, that is, the brightness of the ceiling area in a case where the image of the face area becomes stable. The reference value Lref4 is set to, for example, 90.

The second correction necessity determining unit 22 compares the calculated differential value $\Delta L4$ with a predetermined threshold value Lth4. When the differential value $\Delta L4$ is larger than or equal to the threshold value Lth4, the second correction necessity determining unit 22 determines that the captured image needs to be corrected in the mouth-opening degree detecting process. On the other hand, when the differential value $\Delta L4$ is less than the threshold value Lth4, the second correction necessity determining unit 22 determines that the captured image does not need to be corrected in the mouth-opening degree detecting process.

When the second correction necessity determining unit 22 determines that the captured image needs to be corrected, a second correction parameter setting unit 32 uses the feature amount detected by the feature amount detecting unit 15 to set a correction parameter for the mouth-opening degree detecting process. Specifically, for example, the second correction parameter setting unit 32 sets the correction parameter using the brightness feature amount in the face part area or the brightness feature amount in the structure area. Since the method of setting a correction parameter by the second correction parameter setting unit 32 is similar to the method of setting a correction parameter by the first correction parameter setting unit 31, detailed description thereof will be omitted.

A second image correcting unit 42 corrects the captured image indicated by the captured image data using the correction parameter set by the second correction parameter setting unit 32. Since the method of correcting the captured image by the second image correcting unit 42 is similar to the method of correcting the captured image by the first image correcting unit 41, detailed description thereof will be omitted.

When the second correction necessity determining unit 22 determines that the captured image does not need to be corrected, a mouth-opening degree detecting unit 52 uses the captured image indicated by the captured image data (that is, the captured image before correction) to perform the mouth-opening degree detecting process. Contrarily, when the second correction necessity determining unit 22 determines that the captured image needs to be corrected, the mouth-opening degree detecting unit 52 performs the mouth-opening degree detecting process using the captured image corrected by the second image correcting unit 42.

The mouth-opening degree detecting process is performed by, for example, calculating the degree of opening of the passenger's mouth on the basis of the positional relationship among a plurality of face parts (for example, corners of the mouth, the lips, the nose, the eyes, or the like). Alternatively, for example, the mouth-opening degree detecting process is performed by detecting edges in the lip area. Further alternatively, the mouth-opening degree detecting process is performed by, for example, using a result of machine learning.

A third correction necessity determining unit 23 determines the necessity of correction of the captured image in a detection process of the passenger's face orientation (hereinafter referred to as "face orientation detecting process") using the feature amount detected by the feature amount detecting unit 15. Specifically, for example, the third correction necessity determining unit 23 determines the necessity of correction of the captured image using the brightness feature amount in the face part area or the brightness feature amount in the structure area. Since the determination method by the third correction necessity determining unit 23 is similar to the determination method by the first correction necessity determining unit 21 and the determination method by the second correction necessity determining unit 22, detailed description thereof is omitted.

When the third correction necessity determining unit 23 determines that the captured image needs to be corrected, a third correction parameter setting unit 33 uses the feature amount detected by the feature amount detecting unit 15 to set a correction parameter for the face orientation detecting process. Specifically, for example, the third correction parameter setting unit 33 sets the correction parameter using the brightness feature amount in the face part area or the brightness feature amount in the structure area. Since the method of setting a correction parameter by the third correction parameter setting unit 33 is similar to the method of setting a correction parameter by the first correction parameter setting unit 31 and the method of setting a correction parameter by the second correction parameter setting unit 32, detailed description thereof will be omitted.

A third image correcting unit 43 corrects the captured image indicated by the captured image data using the correction parameter set by the third correction parameter setting unit 33. Since the method of correcting the captured image by the third image correcting unit 43 is similar to the method of correcting the captured image by the first image correcting unit 41 and the method of correcting the captured image by the second image correcting unit 42, detailed description thereof will be omitted.

When the third correction necessity determining unit 23 determines that the captured image does not need to be corrected, a face orientation detecting unit 53 uses the captured image indicated by the captured image data (that is, the captured image before correction) to perform the face orientation detecting process. Contrarily, when the third correction necessity determining unit 23 determines that the captured image needs to be corrected, the face orientation detecting unit 53 performs the face orientation detecting process using the captured image corrected by the third image correcting unit 43.

The face orientation detecting process is performing by, for example, calculating the angle of the face orientation on the basis of the positional relationship among a plurality of face parts (for example, the eyes, the nose, the mouth, or the like). Alternatively, the face orientation detecting process is performed by, for example, using a result of machine learning.

The first correction necessity determining unit 21, the second correction necessity determining unit 22, and the third correction necessity determining unit 23 are included in a correction necessity determining unit 20. The first correction parameter setting unit 31, the second correction parameter setting unit 32, and the third correction parameter setting unit 33 are included in a correction parameter setting unit 30. The first image correcting unit 41, the second image correcting unit 42, and the third image correcting unit 43 are included in an image correcting unit 40. The line-of-sight detecting unit 51, the mouth-opening degree detecting unit 52, and the face orientation detecting unit 53 are included in a passenger state detecting unit 50. The correction necessity determining unit 20, the correction parameter setting unit 30, the image correcting unit 40, and the passenger state detecting unit 50 are included in the second control unit 60.

The line-of-sight detecting process, the mouth-opening degree detecting process, and the face orientation detecting process are all processes for detecting the state of the passenger. That is, the passenger state detecting unit 50 executes the passenger state detecting process, and the passenger state detecting process by the passenger state detecting unit 50 includes three detection items (the line of sight, the mouth-opening degree, and the face orientation). The correction necessity determining unit 20 determines the necessity of correction of the captured image for each of the three detection items. The correction parameter setting unit 30 sets a correction parameter for each of the three detection items. The image correcting unit 40 corrects the captured image for each of the three detection items. The passenger state detecting unit 50 executes passenger state detecting process for each of the three detection items.

A driver state monitoring unit 70 executes a process of determining whether the driver of the vehicle 1 (hereinafter simply referred to as "driver") is in a drowsy driving state, whether the driver is in an inattentive driving state, or the like by using the results of the line-of-sight detecting process by the line-of-sight detecting unit 51, the mouth-opening degree detecting process by the mouth-opening degree detecting unit 52, and the face orientation detecting process by the face orientation detecting unit 53. That is, the driver state monitoring unit 70 implements so-called "driver monitoring" using the result of the passenger state detecting process by the passenger state detecting unit 50.

The correction parameter setting unit 30, the image correcting unit 40, and the passenger state detecting unit 50 are included in the passenger state detection device 100 as the main part thereof. In addition, the first control unit 10, the second control unit 60, and the driver state monitoring unit 70 are included in the control device 200 as the main part thereof.

Next, hardware configurations of the main part of the control device 200 will be described with reference to FIG. 3.

Figure 3A:
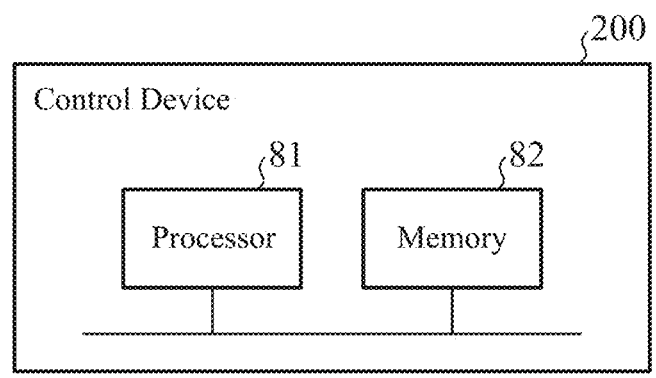
FIG. 3A is a block diagram illustrating a hardware configuration of the control device including the passenger state detection device according to the first embodiment.

As illustrated in FIG. 3A, the control device 200 includes a computer, and the computer includes a processor 81 and a memory 82. The memory 82 stores a program for causing the computer to function as the first control unit 10, the second control unit 60, and the driver state monitoring unit 70. By reading out and executing the program stored in the memory 82 by the processor 81, the functions of the first control unit 10, the second control unit 60, and the driver state monitoring unit 70 are implemented.

The processor 81 includes, for example, a central processing unit (CPU), a graphics processing unit (GPU), a microprocessor, a micro controller, a digital signal processor (DSP), or the like. The memory 82 may be a semiconductor memory such as a random access memory (RAM), a read only memory (ROM), a flash memory, an erasable programmable read only memory (EPROM), or an electrically erasable programmable read only memory (EEPROM), a magnetic disc, an optical disc, or a magneto optic disc.

Figure 3B:
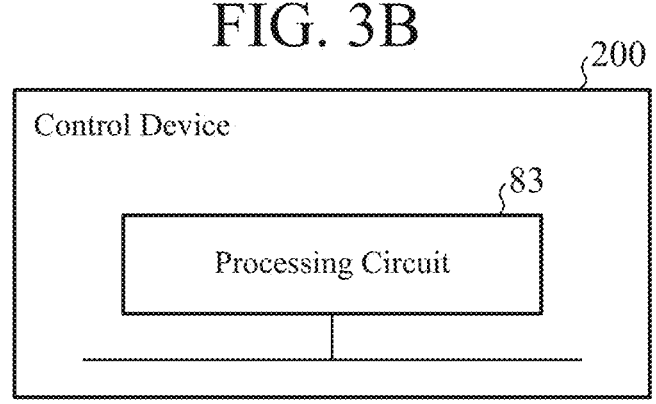
FIG. 3B is a block diagram illustrating another hardware configuration of the control device including the passenger state detection device according to the first embodiment.

Alternatively, as illustrated in FIG. 3B, the functions of the first control unit 10, the second control unit 60, and the driver state monitoring unit 70 may be implemented by a dedicated processing circuit 83. The processing circuit 83 may be, for example, an application specific integrated circuit (ASIC), a programmable logic device (PLD), a field-programmable gate array (FPGA), a system-on-a-chip (SoC), or a system large-scale integration (LSI).

Further alternatively, the control device 200 may include the processor 81, the memory 82, and the processing circuit 83. In this case, some of the functions of the first control unit 10, the second control unit 60, and the driver state monitoring unit 70 may be implemented by the processor 81 and the memory 82 and the remaining functions may be implemented by the processing circuit 83.

Figure 4A:
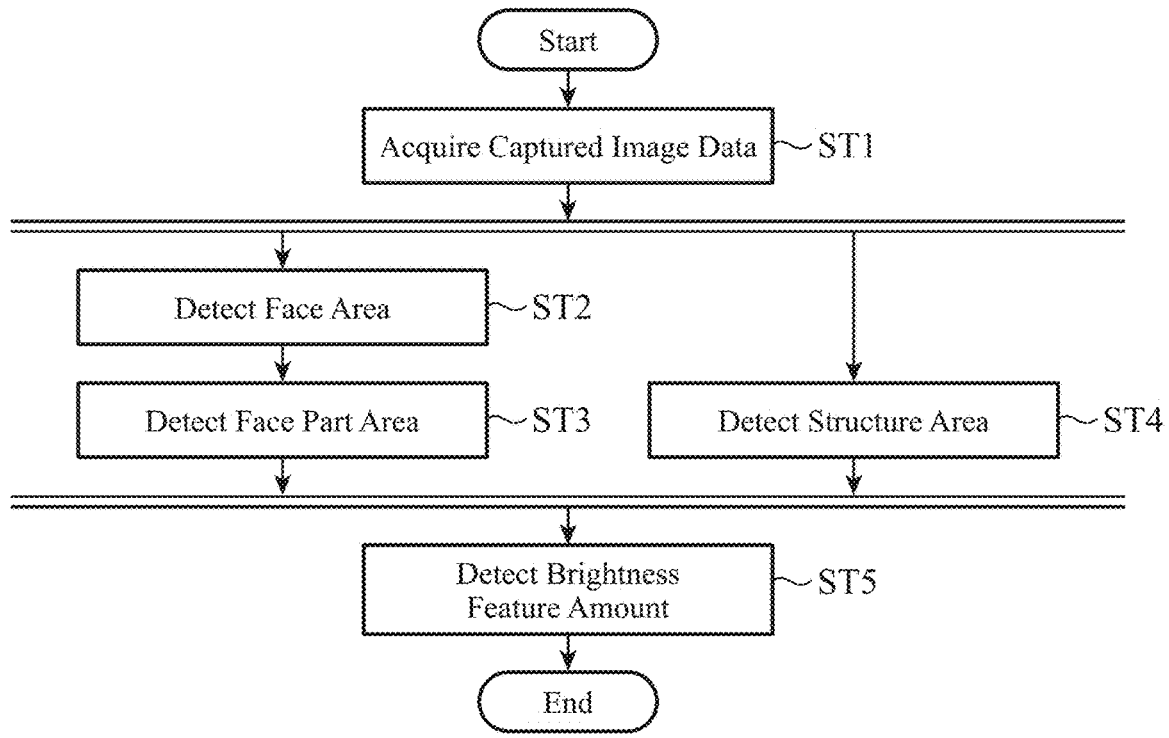
FIG. 4A is a flowchart illustrating the operation of the control device including the passenger state detection device according to the first embodiment.

Next, with reference to a flowchart of FIG. 4A, the operation of the control device 200 will be described focusing on the operation of the first control unit 10. The processes illustrated in FIG. 4A are repeatedly executed, for example, at predetermined time intervals while the control device 200 is powered on.

First, in step ST1, the image data acquiring unit 11 obtains captured image data from the camera 2. The image data acquiring unit 11 outputs the acquired captured image data to the face area detecting unit 12 and the structure area detecting unit 14.

Next, in step ST2, the face area detecting unit 12 detects the face area in the captured image using the captured image data output by the image data acquiring unit 11 in step ST1. The face area detecting unit 12 outputs image data corresponding to the detected face area, that is, face image data, to the face part area detecting unit 13.

Next in step ST3, the face part area detecting unit 13 detects a face part area in the face area using the face image data output by the face area detecting unit 12 in step ST2. The face part area detecting unit 13 outputs image data corresponding to the detected face part area, that is, face part image data, to the feature amount detecting unit 15.

In addition, in step ST4, the structure area detecting unit 14 detects a structure area in the captured image using the captured image data output by the image data acquiring unit 11 in step ST1. The structure area detecting unit 14 outputs image data corresponding to the detected structure area, that is, structure image data, to the feature amount detecting unit 15.

Next in step ST5, the feature amount detecting unit 15 detects the brightness feature amount in the face part area using the face part image data output by the face part area detecting unit 13 in step ST3. The feature amount detecting unit 15 detects the brightness feature amount in the structure area using the structure image data output by the structure area detecting unit 14 in step ST4.

Figure 4B:
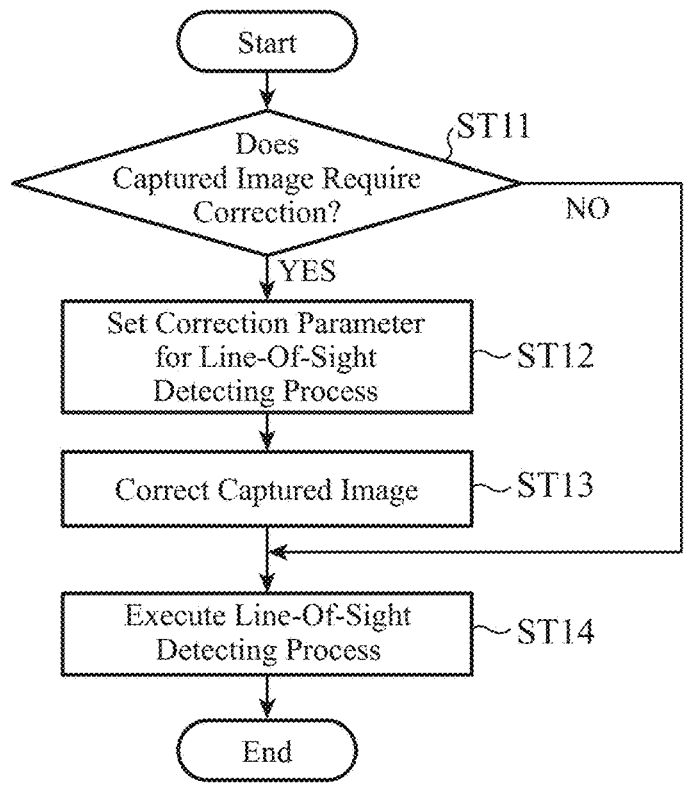
FIG. 4B is a flowchart illustrating another operation of the control device including the passenger state detection device according to the first embodiment.
Figure 4C:
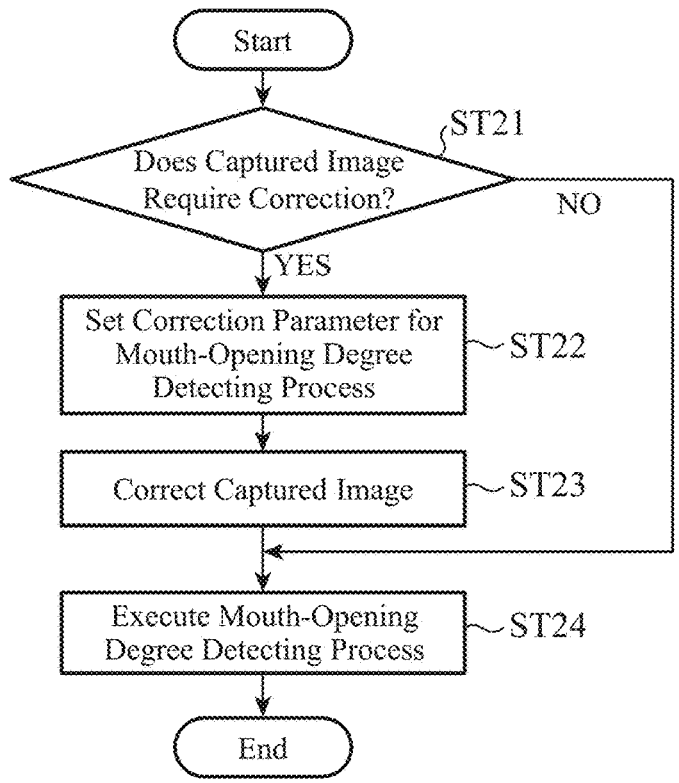
FIG. 4C is a flowchart illustrating still another operation of the control device including the passenger state detection device according to the first embodiment.
Figure 4D:
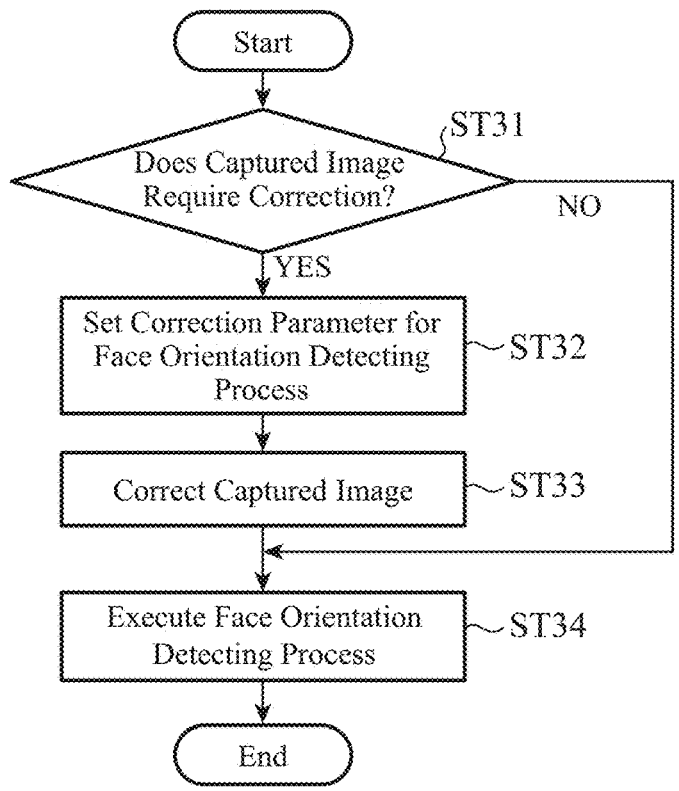
FIG. 4D is a flowchart illustrating yet another operation of the control device including the passenger state detection device according to the first embodiment.

Next, with reference to flowcharts of FIGS. 4B to 4D, the operation of the control device 200 will be described focusing on the operation of the second control unit 60. The control device 200 executes the processes illustrated in each of FIGS. 4B to 4D subsequent to the process illustrated in FIG. 4A.

First, in step ST11, the first correction necessity determining unit 21 determines the necessity of correction of the captured image in the line-of-sight detecting process using the brightness feature amount detected by the feature amount detecting unit 15 in step ST5. Since a specific example of the determination method by the first correction necessity determining unit 21 is as described above, description thereof will not be repeated.

If the first correction necessity determining unit 21 determines that the captured image needs to be corrected (step ST11 "YES"), in step ST12, the first correction parameter setting unit 31 sets a correction parameter for the line-of-sight detecting process using the brightness feature amount detected by the feature amount detecting unit 15 in step ST5. Next, in step ST13, the first image correcting unit 41 corrects the captured image indicated by the captured image data using the correction parameter set by the first correction parameter setting unit 31 in step ST12. Next in step ST14, the line-of-sight detecting unit 51 executes the line-of-sight detecting process using the captured image that is corrected by the first image correcting unit 41 in step ST13.

On the other hand, if the first correction necessity determining unit 21 determines that the captured image does not need to be corrected (step ST11 "NO"), the line-of-sight detecting unit 51 executes the line-of-sight detecting process using the captured image indicated by the captured image data (i.e. the captured image before correction) in step ST14.

Since a specific example of the determination method by the first correction necessity determining unit 21 is as described above, description thereof will not be repeated. Since a specific example of the method of setting a correction parameter by the first correction parameter setting unit 31 is as described above, description thereof will not be repeated. Since a specific example of the line-of-sight detecting process is as described above, description thereof will not be repeated.

Meanwhile, the second correction necessity determining unit 22 determines the necessity of correction of the captured image in the mouth-opening degree detecting process in step ST21 using the brightness feature amount detected by the feature amount detecting unit 15 in step ST5. Since a specific example of the determination method by the second correction necessity determining unit 22 is as described above, description thereof will not be repeated.

If the second correction necessity determining unit 22 determines that the captured image needs to be corrected (step ST21 "YES"), the second correction parameter setting unit 32 sets a correction parameter for the mouth-opening degree detecting process in step ST22 using the brightness feature amount detected by the feature amount detecting unit 15 in step ST5. Next, in step ST23, the second image correcting unit 42 corrects the captured image indicated by the captured image data using the correction parameter that is set by the second correction parameter setting unit 32 in step ST22. Next in step ST24, the mouth-opening degree detecting unit 52 executes the mouth-opening degree detecting process using the captured image that is corrected by the second image correcting unit 42 in step ST23.

On the other hand, when the second correction necessity determining unit 22 determines that the captured image does not need to be corrected (step ST21 "NO"), the mouth-opening degree detecting unit 52 executes the mouth-opening degree detecting process using the captured image indicated by the captured image data (i.e. the captured image before correction) in step ST24.

Since the method of setting a correction parameter by the second correction parameter setting unit 32 is similar to the method of setting a correction parameter by the first correction parameter setting unit 31, detailed description thereof will be omitted. Since the method of correcting the captured image by the second image correcting unit 42 is similar to the method of correcting the captured image by the first image correcting unit 41, detailed description thereof will be omitted. Since a specific example of the mouth-opening degree detecting process is as described above, description thereof will not be repeated.

Meanwhile, the third correction necessity determining unit 23 determines the necessity of correction of the captured image in the face orientation detecting process in step ST31 using the brightness feature amount detected by the feature amount detecting unit 15 in step ST5. Since the determination method by the third correction necessity determining unit 23 is similar to the determination method by the first correction necessity determining unit 21 and the determination method by the second correction necessity determining unit 22, detailed description thereof is omitted.

If the third correction necessity determining unit 23 determines that the captured image needs to be corrected (step ST31 "YES"), the third correction parameter setting unit 33 sets a correction parameter for the face orientation detecting process in step ST32 using the brightness feature amount detected by the feature amount detecting unit 15 in step ST5. Next, in step ST33, the third image correcting unit 43 corrects the captured image indicated by the captured image data using the correction parameter set by the third correction parameter setting unit 33 in step ST32. Next in step ST34, the face orientation detecting unit 53 executes the face orientation detecting process using the captured image that is corrected by the third image correcting unit 43 in step ST33.

On the other hand, when the third correction necessity determining unit 23 determines that the captured image does not need to be corrected (step ST31 "NO"), the face orientation detecting unit 53 executes the face orientation detecting process using the captured image indicated by the captured image data (i.e. the captured image before correction) in step ST34.

Since the method of setting a correction parameter by the third correction parameter setting unit 33 is similar to the method of setting a correction parameter by the first correction parameter setting unit 31 and the method of setting a correction parameter by the second correction parameter setting unit 32, detailed description thereof will be omitted. Since the method of correcting the captured image by the third image correcting unit 43 is similar to the method of correcting the captured image by the first image correcting unit 41 and the method of correcting the captured image by the second image correcting unit 42, detailed description thereof will be omitted. Since a specific example of the face orientation detecting process is as described above, description thereof will not be repeated.

As described above, the passenger state detection device 100 sets a correction parameter for each of the detection items in the passenger state detecting process including the multiple detection items, and corrects the captured image for each of the detection items. As a result, the accuracy of passenger state detecting process including the plurality of detection items can be improved. In addition, it is possible to improve the accuracy of driver monitoring using the result of the passenger state detecting process.

In particular, using the brightness feature amount allows the accuracy to be improved in the line-of-sight detecting process, the mouth-opening degree detecting process, and the face orientation detecting process. As a result, it is possible to improve the accuracy of the process of determining whether the driver is in a drowsy state and the process of determining whether the driver is in an inattentive driving state.

Furthermore, in a case where the brightness value in the captured image is lower than a brightness value that is suitable for the line-of-sight detecting process (that is, in a case where the captured image is dark) with the average value or the maximum value of brightness values used as the brightness feature amount, the first correction necessity determining unit 21 determines that the captured image needs to be corrected, and the first image correcting unit 41 performs correction to increase the brightness value. In a case where the brightness value in the captured image is lower than a brightness value that is suitable for the mouth-opening degree detecting process (that is, in a case where the captured image is dark), the second correction necessity determining unit 22 determines that the captured image needs to be corrected, and the second image correcting unit 42 performs correction to increase the brightness value. In a case where the brightness value in the captured image is lower than a brightness value that is suitable for the face orientation detecting process (that is, in a case where the captured image is dark), the third correction necessity determining unit 23 determines that the captured image needs to be corrected, and the third image correcting unit 43 performs correction to increase the brightness value. For this reason, in a case where the camera 2 includes an infrared camera, it is possible to secure the brightness of the captured image without increasing the light emission amount of the light source that emits infrared rays for imaging (that is, without increasing the current supplied to the light source). Therefore, power consumption for implementing driver monitoring can be reduced.

Note that in a case where a method using results of machine learning are employed in the face orientation detecting process by the face orientation detecting unit 53, the feature amount detecting unit 15 may detect the brightness feature amount in the captured image and brightness feature amounts in a group of images that are comparison targets of the captured image (hereinafter referred to as "reference image group") may be detected.

That is, in this case, dictionary data is stored in the control device 200. The dictionary data includes a reference image group including multiple images (hereinafter referred to as "reference images") corresponding to multiple face orientations on a one-to-one basis. This dictionary data is generated using results of machine learning.

The feature amount detecting unit 15 detects the brightness feature amount in the captured image by calculating the average value, the median value, the standard deviation, or the like of brightness values in the entire area or the face area of the captured image. The feature amount detecting unit 15 also detects the brightness feature amount in the reference image group by calculating the average value, the median value, the standard deviation, or the like of brightness values in the entire area or the face area of each of the reference images.

The third correction necessity determining unit 23 calculates a differential value between the brightness feature amount in the captured image and the brightness feature amount in the reference image group. When the calculated differential value is larger than or equal to a predetermined value, the third correction necessity determining unit 23 determines that the captured image needs to be corrected. On the other hand, when the calculated differential value is less than the predetermined value, the third correction necessity determining unit 23 determines that the captured image does not need to be corrected.

In a case where the third correction necessity determining unit 23 determines that the captured image needs to be corrected, the third correction parameter setting unit 33 sets the correction parameter so that correction of the captured image by the third image correcting unit 43 causes the brightness feature amount in the captured image to be close to the brightness feature amount in the reference image group. The third image correcting unit 43 uses the correction parameter set by the third correction parameter setting unit 33 to perform correction to cause the brightness feature amount in the captured image to be close to the brightness feature amount in the reference image group.

Specifically, let us assume for example that the average value of brightness values in the captured image is 60 and that the average value of the brightness values in the reference image group is 90. In this case, by increasing the brightness value in the captured image by a factor of 1.5, the average value of the brightness values in the captured image becomes 90. Therefore, the third correction parameter setting unit 33 sets the correction parameter to "1.5." The first image correcting unit 41 performs correction to increase the brightness value in the captured image by the factor of 1.5.

In a case where the third correction necessity determining unit 23 determines that the captured image does not need to be corrected, the face orientation detecting unit 53 executes the face orientation detecting process using the captured image indicated by the captured image data (that is, the captured image before correction). That is, the face orientation detecting unit 53 compares the uncorrected captured image with each of the multiple reference images to determine a reference image having the highest similarity to the uncorrected captured image among the multiple reference images, thereby detecting the face orientation of the passenger.

Contrarily, in a case where the third correction necessity determining unit 23 determines that the captured image needs to be corrected, the face orientation detecting unit 53 executes the face orientation detecting process using the captured image that is corrected by the third image correcting unit 43. That is, the face orientation detecting unit 53 compares the corrected captured image with each of the multiple reference images to determine a reference image having the highest similarity to the corrected captured image among the multiple reference images, thereby detecting the face orientation of the passenger.

FIG. 5A is a diagram illustrating an example of a captured image I1 and a histogram H1 illustrating a distribution of brightness values in the captured image I1. FIG. 5B is a diagram illustrating an example of a reference image I2 and a histogram H2 illustrating a distribution of brightness values in the reference image I2. In the example illustrated in FIG. 5, with the third correction parameter setting unit 33 setting the correction parameters as described above, and the third image correcting unit 43 correcting the captured image as described above, the histogram H1 becomes closer to the histogram H2 (that is, the captured image becomes brighter). This can cause the brightness of the captured image to be closer to the brightness of the reference images. As a result, the accuracy of the process of comparing the captured image with each of the reference images can be improved, and thus the accuracy of the face orientation detecting process can be improved.

Furthermore, the face part area detected by the face part area detecting unit 13 only needs to correspond to the detection items in passenger state processes by the passenger state detecting unit 50, and is not limited to the above specific example. For example, the face part area detecting unit 13 may detect at least one of eye areas, an area corresponding to the passenger's nose (hereinafter referred to as "nose area"), an area corresponding to the passenger's mouth (hereinafter referred to as "mouth area"), or areas corresponding to the cheeks of the passenger.

The structure area detected by the structure area detecting unit 14 is not limited to the ceiling area or areas corresponding to pillars of the vehicle 1 (hereinafter referred to as "pillar areas"). Note that it is preferable that a structure whose positional relationship with the camera 2 is constant (e.g., the ceiling or pillars) is set as a detection target, and it is not preferable that a structure whose positional relationship with the camera 2 may change (e.g., a seat itself or a headrest of the seat on which a passenger is seated) is set as a detection target.

That is, the positions of structure areas that correspond to the former structures are fixed in the captured image. In addition, the former structures are always imaged with the same brightness, in the same shape, and in the same size in captured images unless the environment such as external light or the position of the camera 2 in the vehicle 1 changes. For this reason, the feature amounts in the structure areas are less likely to fluctuate as compared to the latter structures. Therefore, a feature amount in a structure area that corresponds to a former structure is more suitable for use in setting the correction parameters than a feature amount in a structure area that corresponds to a latter structure.

In each of the first correction necessity determining unit 21, the second correction necessity determining unit 22, and the third correction necessity determining unit 23, which one of a feature amount in the face part area or a feature amount in the structure area is to be used may be set in advance, or may be switched depending on a timeframe in a day. In each of the first correction parameter setting unit 31, the second correction parameter setting unit 32, and the third correction parameter setting unit 33, which one of a feature amount in the face part area or a feature amount in the structure area is to be used may be set in advance, or may be switched depending on a timeframe in a day.

For example, in the morning and daytime timeframes, there is a high probability that the feature amount in the structure area is stably detected due to the environment such as the brightness outside the vehicle. On the other hand, in the evening and nighttime timeframes, there is a high probability that it is difficult to stably detect the feature amount in the structure area. Therefore, the feature amount in the structure area may be used in the morning and daytime timeframes, with the feature amount in the face part area used in the evening and nighttime timeframes.

The feature amount detecting unit 15 may not detect the feature amount in the structure area in a case where the first correction necessity determining unit 21, the second correction necessity determining unit 22, and the third correction necessity determining unit 23 all use the feature amount in the face part area, and the first correction parameter setting unit 31, the second correction parameter setting unit 32, and the third correction parameter setting unit 33 all use the feature amount in the face part area. On the other hand, the feature amount detecting unit 15 may not detect the feature amount in the face part area in a case where the first correction necessity determining unit 21, the second correction necessity determining unit 22, and the third correction necessity determining unit 23 all use the feature amount in the structure area, and the first correction parameter setting unit 31, the second correction parameter setting unit 32, and the third correction parameter setting unit 33 all use the feature amount in the structure area.

That is, the feature amount detecting unit 15 only needs to detect at least one of the feature amount in the face part area or the feature amount in the structure area. The correction necessity determining unit 20 only needs to determine the necessity of correction of the captured image using at least one of the feature amount in the face part area and the feature amount in the structure area. The correction parameter setting unit 30 only needs to set the correction parameter using at least one of the feature amount in the face part area or the feature amount in the structure area.

Moreover, the correction necessity determining unit 20 only needs to determine the necessity of correction of the captured image for each detection item in the passenger state detecting processes using the feature amount detected by the feature amount detecting unit 15. That is, determination methods by each of the first correction necessity determining unit 21, the second correction necessity determining unit 22, and the third correction necessity determining unit 23 are not limited to the above specific examples.

The correction parameter setting unit 30 only needs to set a correction parameter for each detection item in the passenger state detecting processes using the feature amount detected by the feature amount detecting unit 15. That is, the method of setting the correction parameters by each of the first correction parameter setting unit 31, the second correction parameter setting unit 32, and the third correction parameter setting unit 33 is not limited to the above specific examples.

The image correcting unit 40 only needs to correct the captured image for each detection item in the passenger state detecting processes using the correction parameters set by the correction parameter setting unit 30. That is, methods of correcting the captured image by each of the first image correcting unit 41, the second image correcting unit 42, and the third image correcting unit 43 are not limited to the above specific examples. Each of the first image correcting unit 41, the second image correcting unit 42, and the third image correcting unit 43 may perform any correction on the captured image such as correction of the brightness (e.g., contrast correction or gamma correction), correction of blur (e.g., Gaussian filter or median filter), or correction of edges (e.g., Sobel filter or Laplacian filter).

In addition, each of the first image correcting unit 41, the second image correcting unit 42, and the third image correcting unit 43 may correct the entire area of the captured image, or may correct a partial area of the captured image. For example, the first image correcting unit 41 may correct only the area used in the line-of-sight detecting process (for example, eye areas) in the captured image. The second image correcting unit 42 may correct only the area used in the mouth-opening degree detecting process (for example, face area) in the captured image. The third image correcting unit 43 may correct only the area used in the face orientation detecting process (for example, face area) in the captured image.

Furthermore, the detection items in the passenger state detecting processes by the passenger state detecting unit 50 are not limited to the line of sight of the passenger, the mouth-opening degree of the passenger, or the face orientation of the passenger. For example, the passenger state detecting unit 50 may execute a process of detecting the passenger's complexion (hereinafter referred to as "complexion detecting process"). As another example, the passenger state detecting unit 50 may execute a process of detecting the passenger's eye opening degree (hereinafter referred to as "eye-opening degree detecting process"). That is, the passenger state detecting process by the passenger state detecting unit 50 is only required to include multiple detection items. The multiple detection items may include at least one of the line of sight of the passenger, the mouth-opening degree of the passenger, the face orientation of the passenger, the complexion of the passenger, or the eye-opening degree of the passenger.

Meanwhile, the feature amount detected by the feature amount detecting unit 15 is not limited to the brightness feature amount. For example, the feature amount detecting unit 15 may detect a feature amount based on colors (hereinafter referred to as "color feature amount") by detecting color values (for example, RGB values) in at least one of the face part area and the structure area. Furthermore, for example, the feature amount detecting unit 15 may detect a feature amount based on edges (hereinafter referred to as "edge feature amount") by detecting a histogram of oriented gradients (HOG) or an edge orientation histogram (EOH) in at least one of the face part area and the structure area.

That is, the feature amount detecting unit 15 may detect at least one of a brightness feature amount, a color feature amount, or an edge feature amount. The correction necessity determining unit 20 may determine the necessity of correction of the captured image using at least one of a brightness feature amount, a color feature amount, or an edge feature amount. The correction parameter setting unit 30 may set a correction parameter using at least one of a brightness feature amount, a color feature amount, or an edge feature amount.

In general, a captured image includes multiple frames that are temporally continuous. The necessity determination (i.e., processes of steps ST11, ST21, and ST31) by the correction necessity determining unit 20 may be executed for every frame, or may be executed for every predetermined number of frames. In a case where the necessity determination is executed for every predetermined number of frames, correction of a frame on which no necessity determination is executed depends on a result of the most recent necessity determination (and the most recent correction parameters). For example, if it is determined in necessity determination on a first frame that correction is required and the correction parameter is set to "2.5" in a case where the necessity determination is executed for every three frames, it goes without saying that correction with "2.5" is performed on the first frame, and correction with "2.5" is also performed on a second frame and a third frame. Then, if it is determined in necessity determination on a fourth frame that correction is required and the correction parameter is set to "2.1," it goes without saying that correction with "2.1" is performed on the fourth frame, and correction with "2.1" is also performed on a sixth frame and a seventh frame.

Meanwhile, the driver state monitoring unit 70 is only required to implement driver monitoring using the detection results of the passenger state detecting unit 50. Determination items by the driver state monitoring unit 70 are not limited to determination whether the driver is in a drowsy driving state or determination whether the driver is in an inattentive driving state. For example in a case where the passenger state detecting unit 50 executes a complexion detecting process, the driver state monitoring unit 70 uses the result of the complexion detecting process by the passenger state detecting unit 50 to execute a process of determining whether the driver is in an incapable-of-driving state (so-called "dead man").

That is, the driver state monitoring unit 70 uses the result of the passenger state detecting process by the passenger state detecting unit 50 to execute at least one of the process of determining whether the driver is in a drowsy driving state, the process of determining whether the driver is in an inattentive driving state, or the process of determining whether the driver is in an incapable-of-driving state.

Figure 6:
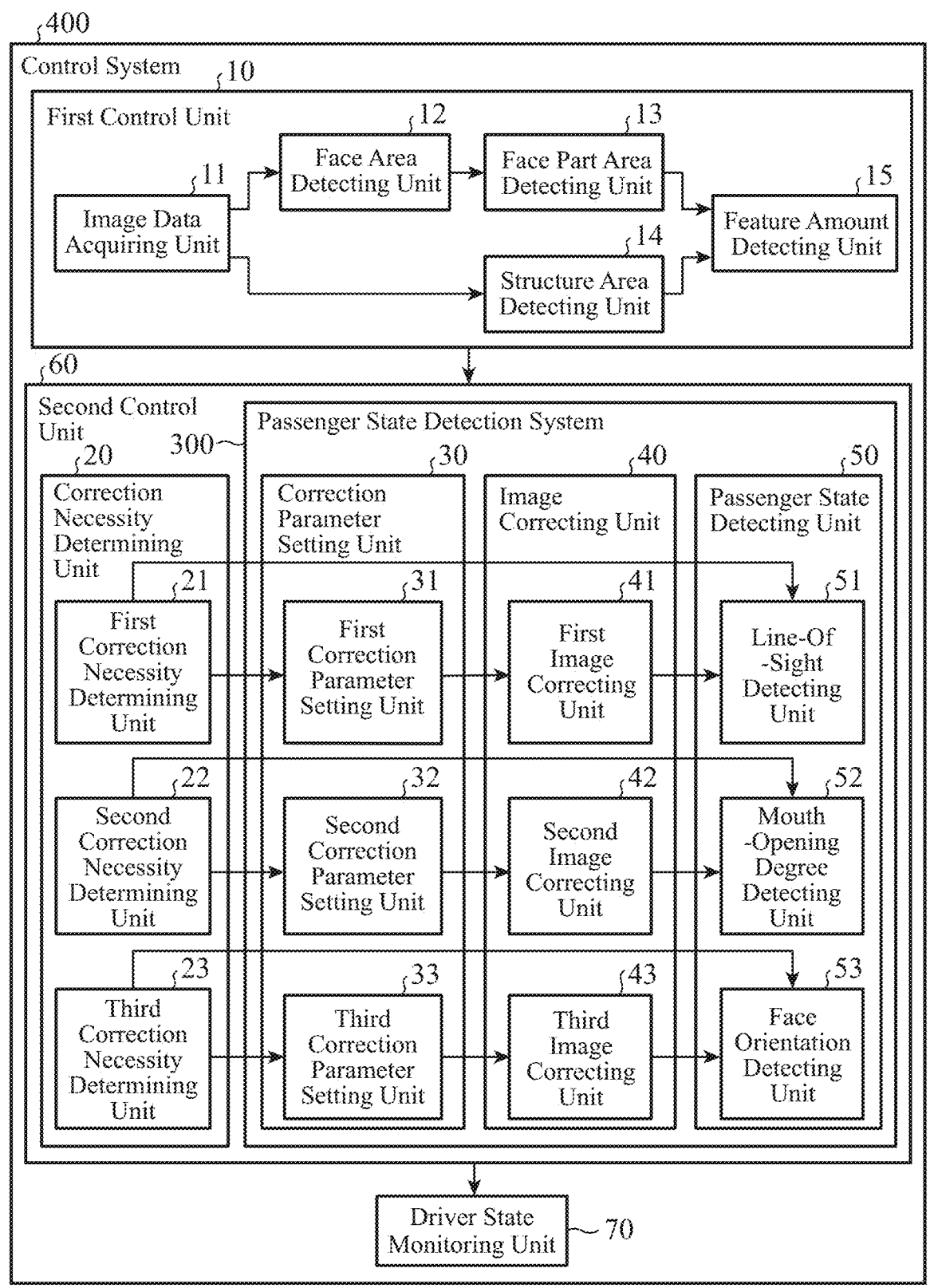
FIG. 6 is a block diagram illustrating the main part of a control system including a passenger state detection system according to the first embodiment.
Figure 7A:
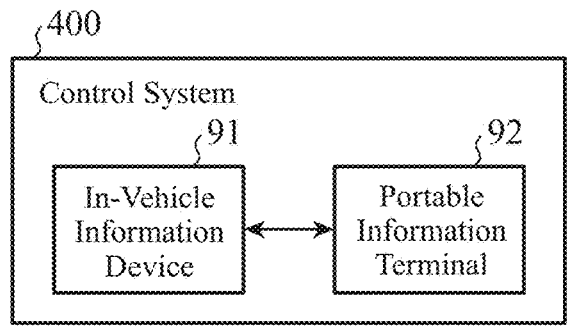
FIG. 7A is a block diagram illustrating a system configuration of the control system including the passenger state detection system according to the first embodiment.
Figure 7B:
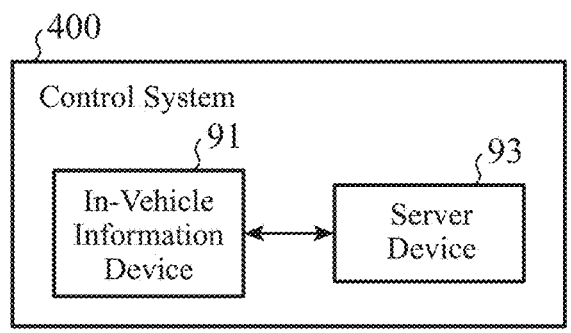
FIG. 7B is a block diagram illustrating another system configuration of the control system including the passenger state detection system according to the first embodiment.
Figure 7C:
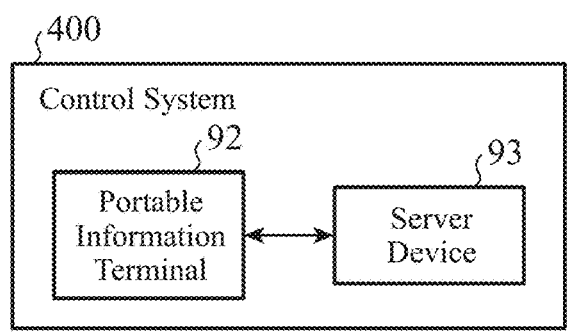
FIG. 7C is a block diagram illustrating another system configuration of the control system including the passenger state detection system according to the first embodiment.
Figure 7D:
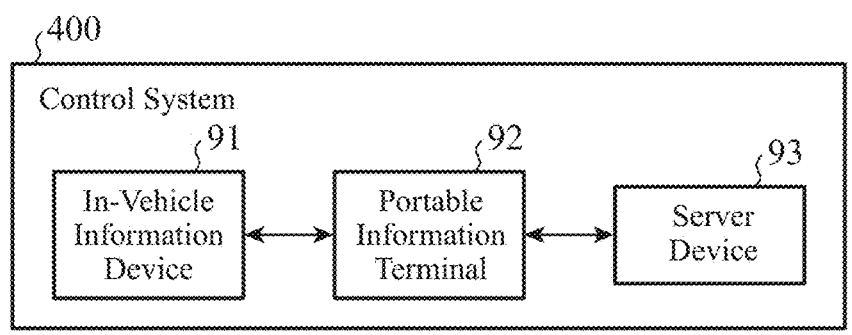
FIG. 7D is a block diagram illustrating another system configuration of the FIG. 8 is a block diagram illustrating the main part of a control device including another passenger state detection device according to the first embodiment.

Alternatively, the correction parameter setting unit 30, the image correcting unit 40, and the passenger state detecting unit 50 may be included in a passenger state detection system 300 as the main part thereof as illustrated in FIG. 6. Moreover, the first control unit 10, a second control unit 60, and the driver state monitoring unit 70 may be included in a control system 400 as the main part thereof.

FIG. 7A to FIG. 7D each illustrate a system configuration of the main part of the control system 400. As illustrated in FIG. 7, the control system 400 includes any two or more of an in-vehicle information device 91 that can be mounted on the vehicle 1, a portable information terminal 92 such as a smartphone that can be brought into the vehicle 1, or a server device 93 that can freely communicate with the in-vehicle information device 91 or the portable information terminal 92. It suffices to implement the functions of the first control unit 10, the second control unit 60, and the driver state monitoring unit 70 by cooperation of any two or more of the in-vehicle information device 91, the portable information terminal 92, or the server device 93.

Figure 8:
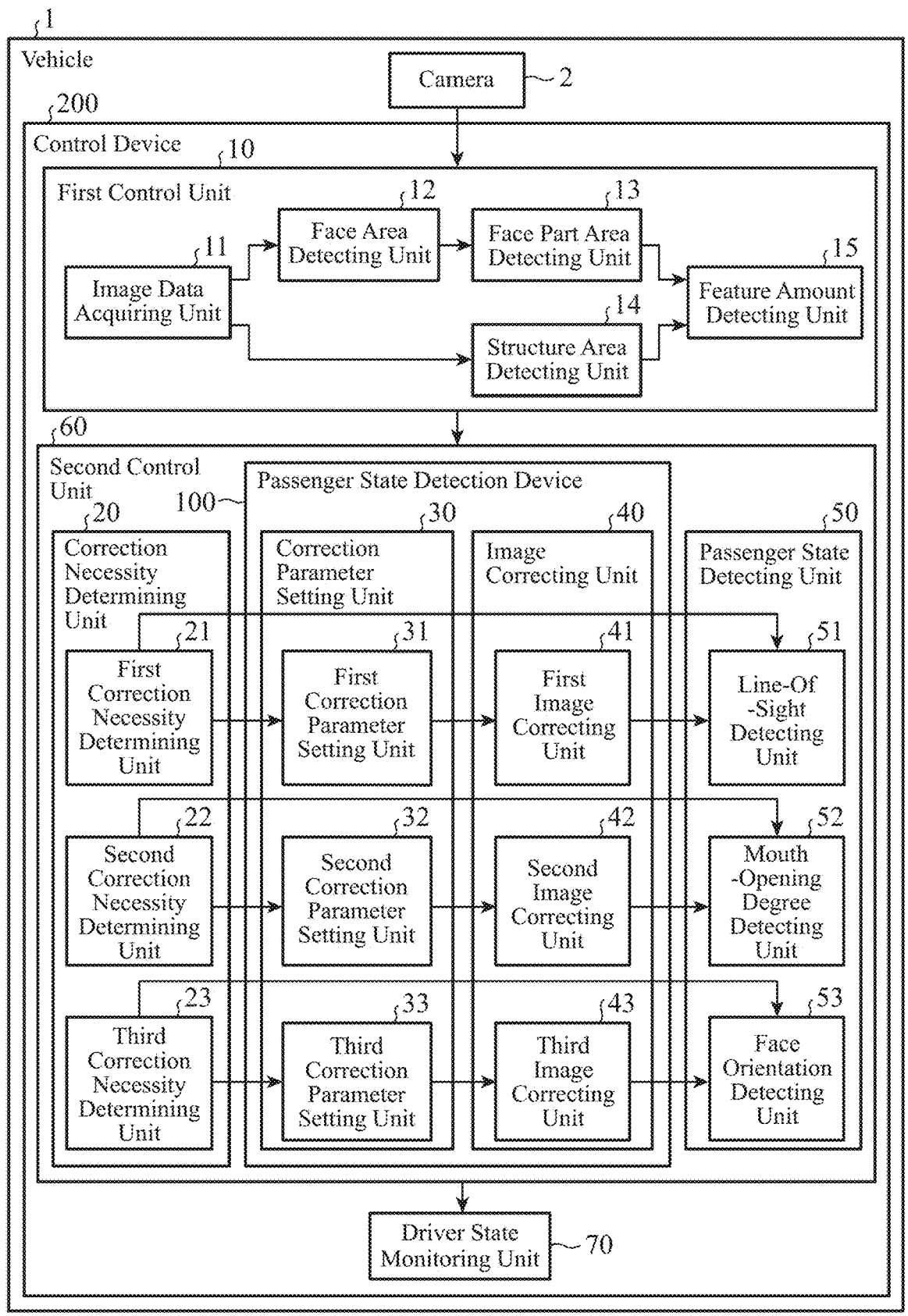
Figure 9:
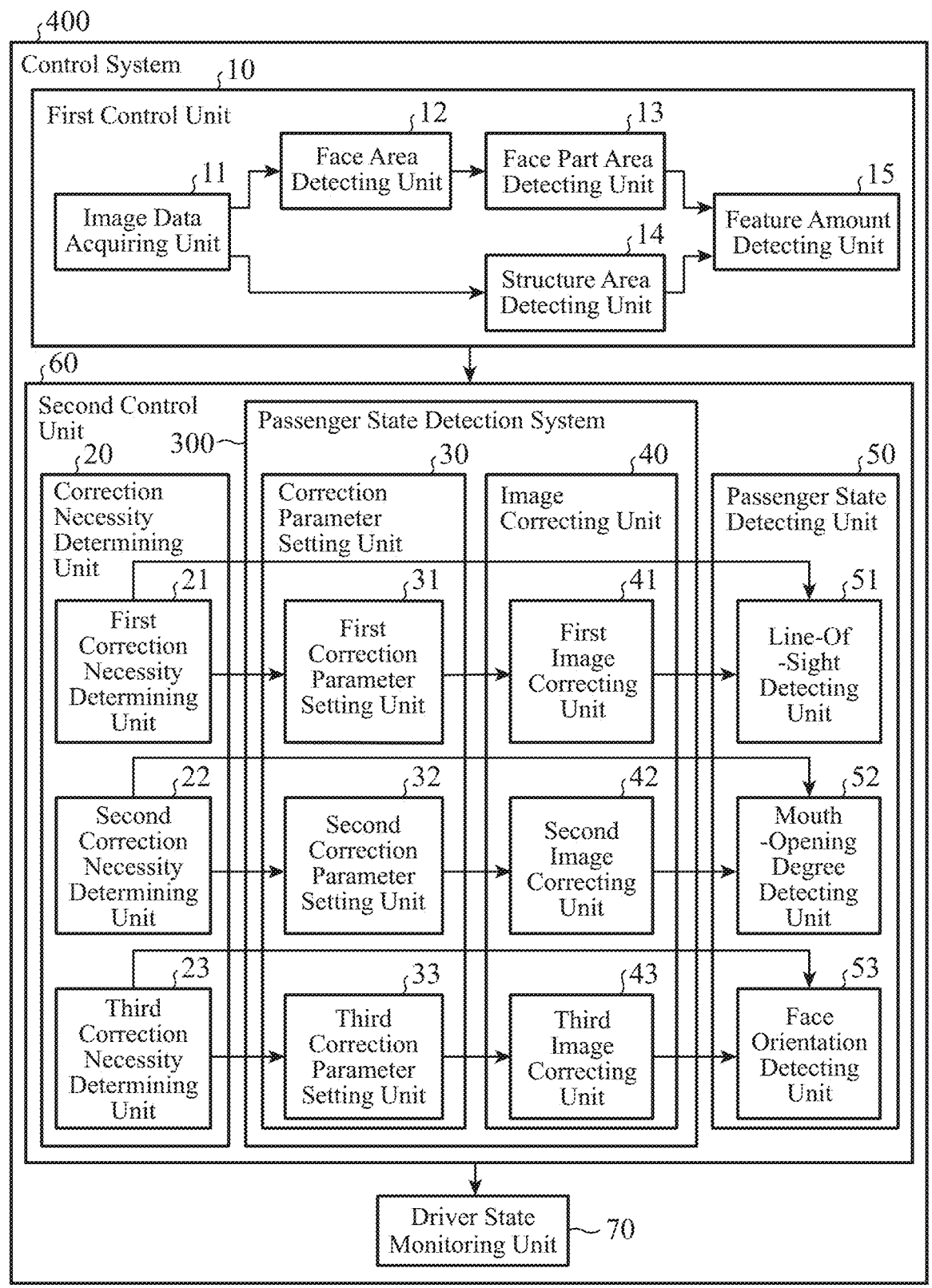
FIG. 9 is a block diagram illustrating the main part of a control system including still another passenger state detection system according to the first embodiment.

Further alternatively, the correction parameter setting unit 30 and the image correcting unit 40 may be included in a passenger state detection device 100 as the main part thereof as illustrated in FIG. 8. Further alternatively, the correction parameter setting unit 30 and the image correcting unit 40 may be included in a passenger state detection system 300 as the main part thereof as illustrated in FIG. 9.

Furthermore, the control device 200 and the control system 400 can also be used for a moving object different from the vehicle 1. That is, the passenger state detection device 100 and the passenger state detection system 300 can be used not only for automobiles, but also for a passenger state detecting process in moving objects such as railway vehicles, ships, and aircrafts.

As described above, the passenger state detection device 100 according to the first embodiment includes: the correction parameter setting unit 30 for setting a correction parameter for a captured image captured by the camera 2 for capturing the vehicle interior for each of the detection items in the passenger state detecting process including the multiple detection items using at least one of the feature amount in the face part area corresponding to the passenger's face part in the captured image or the feature amount in the structure area that corresponds to a structure in the vehicle interior in the captured image; and the image correcting unit 40 for correcting the captured image for each of the detection items in the passenger state detecting process using the correction parameter set by the correction parameter setting unit 30. As a result, the accuracy of passenger state detecting process including the plurality of detection items can be improved. In addition, it is possible to improve the accuracy of driver monitoring using the result of the passenger state detecting process.

The passenger state detection device 100 further includes the passenger state detecting unit 50 that executes the passenger state detecting process for each detection item using the captured image corrected by the image correcting unit 40. This allows the accuracy to be improved in the line-of-sight detecting process, the mouth-opening degree detecting process, and the face orientation detecting process, for example. As a result, for example, it is possible to improve the accuracy of the process of determining whether the driver is in a drowsy driving state and the process of determining whether the driver is in an inattentive driving state.

In addition, the passenger state detection system 300 according to the first embodiment includes: the correction parameter setting unit 30 for setting a correction parameter for a captured image captured by the camera 2 for capturing the vehicle interior for each of the detection items in the passenger state detecting process including the multiple detection items using at least one of the feature amount in the face part area corresponding to the passenger's face part in the captured image or the feature amount in the structure area that corresponds to a structure in the vehicle interior in the captured image; and the image correcting unit 40 for correcting the captured image for each of the detection items in the passenger state detecting process using the correction parameter set by the correction parameter setting unit 30. As a result, effects similar to those of the passenger state detection device 100 can be obtained.

In addition, the passenger state detection method according to the first embodiment includes: the steps ST12, ST22, and ST32 of setting, by the correction parameter setting unit 30, a correction parameter for a captured image captured by the camera 2 for capturing a vehicle interior for each of detection items in passenger state detecting process including the multiple detection items using at least one of a feature amount in a face part area corresponding to a passenger's face part in the captured image or a feature amount in a structure area that corresponds to a structure in the vehicle interior in the captured image; and the steps ST13, ST23, and ST33 of correcting, by the image correcting unit 40, the captured image for each of the detection items in the passenger state detecting process using the correction parameter set by the correction parameter setting unit 30. As a result, effects similar to those of the passenger state detection device 100 can be obtained.

Second Embodiment

Figure 10:
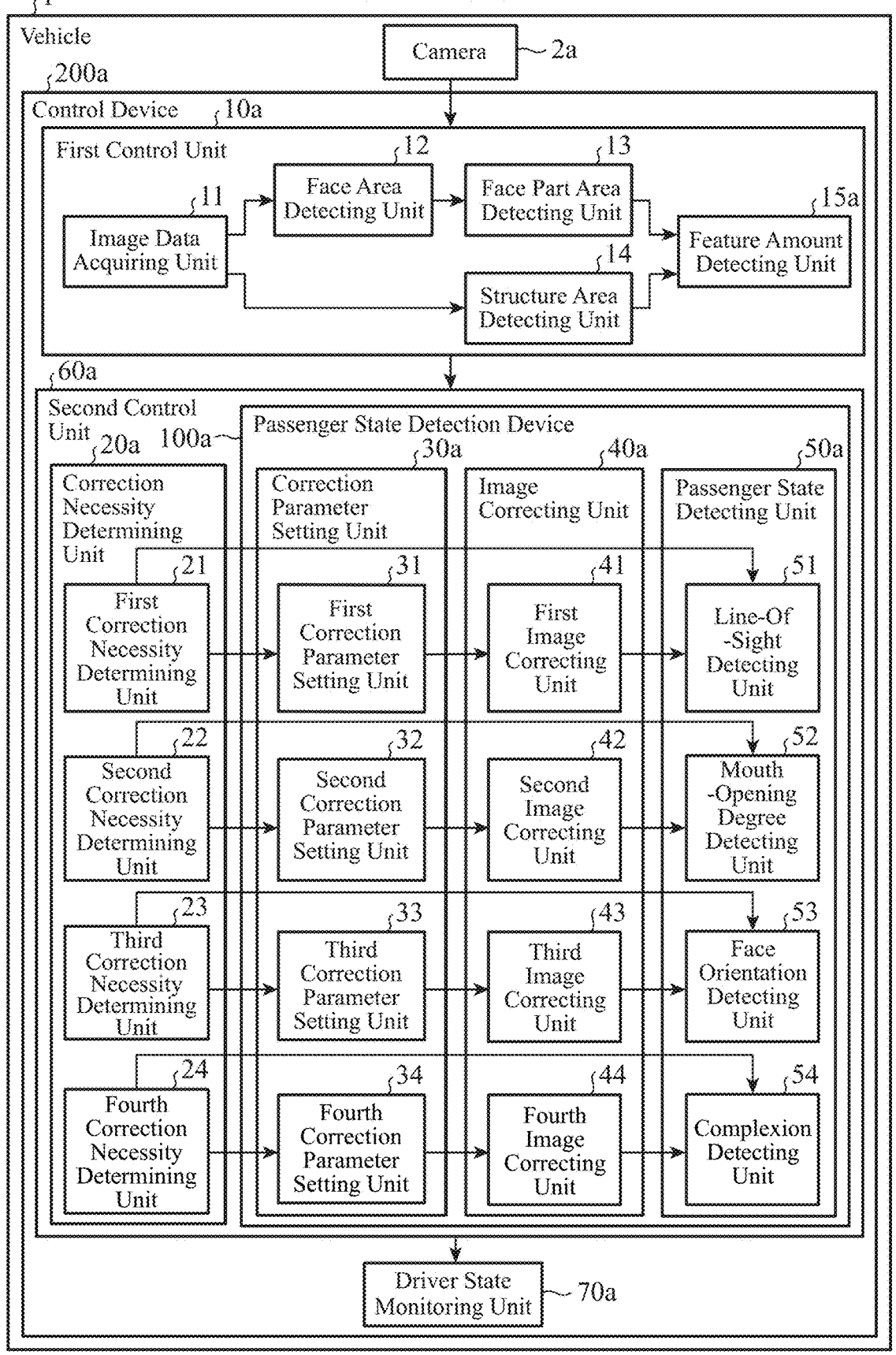
FIG. 10 is a block diagram illustrating the main part of a control device including a passenger state detection device according to a second embodiment.

FIG. 10 is a block diagram illustrating the main part of a control device including a passenger state detection device according to a second embodiment. With reference to FIG. 10, a passenger state detection device 100a according to the second embodiment will be described focusing on an example in which the passenger state detection device 100a is included in a control device 200a in a vehicle 1. Note that in FIG. 10 the same symbol is given to a block similar to that illustrated in FIG. 1, and description thereof is omitted.

A camera 2a includes one or a plurality of visible light cameras. More specifically, the camera 2a includes one or a plurality of color cameras.

A feature amount detecting unit 15a detects the brightness feature amount in a face part area using face part image data output from a face part area detecting unit 13. The feature amount detecting unit 15a also detects the brightness feature amount in a structure area using structure image data output by a structure area detecting unit 14. The method of detecting the brightness feature amount by the feature amount detecting unit 15a is similar to the method of detecting the brightness feature amount by the feature amount detecting unit 15 illustrated in FIG. 1, and thus detailed description is omitted.

In addition, the feature amount detecting unit 15a detects the color feature amount in the face part area using the face part image data output from the face part area detecting unit 13. Specifically, for example, the feature amount detecting unit 15a detects color values (for example, RGB values) in each of multiple areas included in the face part area.

The feature amount detecting unit 15a also detects the color feature amount in the structure area using the structure image data output by the structure area detecting unit 14. Specifically, for example, the feature amount detecting unit 15a detects color values (for example, RGB values) in the structure area.

An image data acquiring unit 11, a face area detecting unit 12, the face part area detecting unit 13, the structure area detecting unit 14, and the feature amount detecting unit 15a are included in a first control unit 10a.

A fourth correction necessity determining unit 24 determines the necessity of correction of the captured image in a complexion detecting process using a feature amount detected by the feature amount detecting unit 15a.

Specifically, for example, the fourth correction necessity determining unit 24 determines the necessity of correction of the captured image using the color feature amounts in the face part area and color feature amounts to be compared with these color feature amounts (hereinafter referred to as "reference color feature amounts"). Specifically, the reference color feature amounts includes RGB values to be compared with RGB values in the iris areas (hereinafter referred to as "first reference RGB values") and RGB values (hereinafter referred to as "second reference RGB values") to be compared with RGB values in an area corresponding to the passenger's skin (hereinafter referred to as "skin area"). The fourth correction necessity determining unit 24 compares the RGB values of the iris areas with the first reference RGB values and the RGB values of the skin area with the second reference RBG values using the feature amount information. The fourth correction necessity determining unit 24 determines whether a so-called "color cast" has occurred using the comparison results.

Here, a color cast refers to a state in which the color tone over the entire area of a captured image is biased toward a specific color. For example in a case where the vehicle 1 is traveling in a tunnel and the vehicle 1 is illuminated with yellow light by lightings installed in the tunnel, the color tone over the entire area of a captured image becomes yellowish. Another example is a case where the vehicle 1 is running in the evening timeframe and the vehicle 1 is illuminated with red light due to sunset, the color tone over the entire area of the captured image becomes reddish.

As an example, let us assume that RGB values of the iris areas are (30, 22, 22) and that RGB values of the skin area are (255, 170, 147) in a state where the first reference RGB values are set to (30, 30, 30) and the second reference RGB values are set to (255, 226, 196). In this case, since the Green values and the Blue values are lower than the reference RGB values, it is understood that a color cast of yellow to orange has occurred.

The fourth correction necessity determining unit 24 calculates differential values of the RGB values of the iris areas from the first reference RGB values and differential values of the RGB values of the skin area from the second reference RGB values. The fourth correction necessity determining unit 24 determines that a color cast has occurred when these differential values are greater than or equal to a predetermined value. On the other hand, the fourth correction necessity determining unit 24 determines that no color cast has occurred when these differential values are less than the predetermined value.

When it is determined that a color cast has occurred, the fourth correction necessity determining unit 24 determines that the captured image needs to be corrected in a complexion detecting process. On the other hand, when it is determined that no color cast has occurred, the fourth correction necessity determining unit 24 determines that the captured image does not need to be corrected in the complexion detecting process.

Here, a method of setting the reference color feature amounts related to the face part area will be described. From power-on of the control device 200a (or after the start of the engine of the vehicle 1) to an elapse of a predetermined period of time, the first control unit 10a repeatedly executes, at predetermined time intervals, a process of acquiring captured image data, a process of detecting a face area, a process of detecting face part areas (for example, iris areas, eyelid areas, lip areas, nose area, and skin area), and a process of detecting color feature amounts in the face part areas. The fourth correction necessity determining unit 24 sets a reference color feature amount on the basis of the color feature amount detected by these processes.

Note that in a case where the control device 200a has a function of executing a personal authentication process on a passenger, image data indicating an image capturing the face of the passenger is registered in a database for the personal authentication process. In this case, the fourth correction necessity determining unit 24 may set the reference color feature amounts on the basis of color feature amounts in the registered image data.

Alternatively, for example, the fourth correction necessity determining unit 24 determines the necessity of correction of a captured image using color feature amounts in the structure area and reference color feature amounts to be compared with the color feature amounts. Specifically, the reference color feature amounts include RGB values to be compared with RGB values of the ceiling area (hereinafter referred to as "third reference RGB values"). The fourth correction necessity determining unit 24 compares the RGB values of the ceiling area with the third reference RGB values using the feature amount information. The fourth correction necessity determining unit 24 determines whether a color cast has occurred using the comparison result.

As an example, let us assume that the RGB values of the ceiling area are (76, 128, 128) in a state where the third reference RGB values are set to (128, 128, 128). In this case, since the red value is lower in comparison with the reference RGB values, a color cast of red has occurred.

The fourth correction necessity determining unit 24 calculates differential values of the RGB values of the ceiling area from the third reference RGB values. The fourth correction necessity determining unit 24 determines that a color cast has occurred when these calculated differential values are greater than or equal to a predetermined value. On the other hand, the fourth correction necessity determining unit 24 determines that no color cast has occurred when these calculated differential values are less than the predetermined value.

When it is determined that a color cast has occurred, the fourth correction necessity determining unit 24 determines that the captured image needs to be corrected in a complexion detecting process. On the other hand, when it is determined that no color cast has occurred, the fourth correction necessity determining unit 24 determines that the captured image does not need to be corrected in the complexion detecting process.

Here, a method of setting reference color feature amounts related to structure areas will be described. From power-on of the control device 200a (or after the start of the engine of the vehicle 1) to an elapse of a predetermined period of time, the first control unit 10a repeatedly executes, at predetermined time intervals, a process of acquiring captured image data, a process of detecting a structure area (for example, ceiling area or pillar area), and a process of detecting color feature amounts in the structure area. The fourth correction necessity determining unit 24 sets a reference color feature amount on the basis of the color feature amount detected by these processes.

Note that the reference color feature amounts may be stored in advance in the fourth correction necessity determining unit 24, and the fourth correction necessity determining unit 24 may use the pre-stored reference color feature amounts. In this case, the reference color feature amounts are fixed values.

When the fourth correction necessity determining unit 24 determines that the captured image needs to be corrected, a fourth correction parameter setting unit 34 uses the feature amount detected by the feature amount detecting unit 15a to set a correction parameter for the complexion detecting process. A fourth image correcting unit 44 corrects the captured image indicated by the captured image data using the correction parameter set by the fourth correction parameter setting unit 34.

Specifically, for example let us assume that RGB values of the iris areas indicated by the feature amount information are (30, 22, 22) in a state where the first reference RGB values are set to (30, 30, 30). In this case, the RGB values of the iris areas have a Red value equivalent to that of the first reference RGB values and a Green value and a Blue value of approximately 0.75 times those of the first reference RGB values.

Therefore, the fourth correction parameter setting unit 34 sets the correction parameter for the Green value and the Blue value to "1.3" on the basis of 1/0.75≈1.3. The fourth image correcting unit 44 performs correction to increase the Green value and the Blue value of the captured image by a factor of 1.3. This makes it possible to correct a color cast of yellow to orange and to have the white balance of the captured image adapted for the complexion detecting process.

As another example, let us assume that RGB values of the ceiling area indicated by the feature amount information are (76, 128, 128) in a state where the third reference RGB values are set to (128, 128, 128). In this case, the RGB values of the ceiling area have a Red value approximately 0.6 times that of the third reference RGB values and a Green value and a Blue value equivalent to those of the third reference RGB values.

Therefore, the fourth correction parameter setting unit 34 sets the correction parameter for the Red value to "1.7" on the basis of 1/0.6≈1.7. The fourth image correcting unit 44 performs correction to increase the Red value in the captured image by the factor of 1.7. This makes it possible to correct a color cast of red and to have the white balance of the captured image adapted for the complexion detecting process.

When the fourth correction necessity determining unit 24 determines that the captured image does not need to be corrected, the complexion detecting unit 54 performs the complexion detecting process using the captured image indicated by the captured image data (that is, the captured image before correction). Contrarily, when the fourth correction necessity determining unit 24 determines that the captured image needs to be corrected, the complexion detecting unit 54 performs the complexion detecting process using the captured image corrected by the fourth image correcting unit 44.

Specifically, for example, the complexion detecting unit 54 calculates differential values between RGB values in the skin area of the uncorrected captured image or the corrected captured image and the second reference RGB values. When the calculated differential value is larger than or equal to a predetermined threshold value, the complexion detecting unit 54 determines that the complexion of the passenger is in an abnormal state. On the other hand, when the calculated differential value is less than the threshold value, the complexion detecting unit 54 determines that the complexion of the passenger is in a normal state.

As an example, as illustrated in each of FIG. 11A and FIG. 11B, let us assume that the Green value and the Blue value have been corrected with a factor of 1.3 since the RGB values of the iris areas indicated by the feature amount information are (30, 22, 22) in a state where the first reference RGB values are set to (30, 30, 30).

In the example illustrated in FIG. 11A, since the RGB values of the skin area in the captured image before correction are (255, 170, 147), the RGB values of the skin area in the corrected captured image are (255, 221, 191). In this case, the RGB values (255, 221, 191) of the skin area in the corrected captured image are substantially equivalent to the second reference RGB values (255, 226, 196). Therefore, it is determined that the passenger's complexion is in a normal state.

On the other hand, in the example illustrated in FIG. 11B, since the RGB values of the skin area in the captured image before correction are (255, 153, 132), the RGB values of the skin area in the corrected captured image are (255, 199, 172). In this case, the green value and the blue value of the RGB values (255, 199, 172) of the skin area in the corrected captured image are lower than those of the second reference RGB values (255, 226, 196). Therefore, it is determined that the passenger's complexion is in an abnormal state. More specifically, it is determined that the passenger's complexion has changed from red to orange as compared to the normal complexion.

Note that even in a case where color feature amounts in the structure area are used for the determination by the fourth correction necessity determining unit 24 and the setting of a correction parameter by the fourth correction parameter setting unit 34, color feature amounts in the face part area (more specifically, the skin area) are used in the complexion detecting process by the complexion detecting unit 54. That is, also in this case, the complexion detecting unit 54 executes a complexion detecting process similar to the above specific example.

A first correction necessity determining unit 21, a second correction necessity determining unit 22, a third correction necessity determining unit 23, and the fourth correction necessity determining unit 24 are included in a correction necessity determining unit 20a. A first correction parameter setting unit 31, a second correction parameter setting unit 32, a third correction parameter setting unit 33, and the fourth correction parameter setting unit 34 are included in a correction parameter setting unit 30a. A first image correcting unit 41, a second image correcting unit 42, a third image correcting unit 43, and the fourth image correcting unit 44 are included in an image correcting unit 40a. A line-of-sight detecting unit 51, a mouth-opening degree detecting unit 52, a face orientation detecting unit 53, and the complexion detecting unit 54 are included in a passenger state detecting unit 50a. The correction necessity determining unit 20a, the correction parameter setting unit 30a, the image correcting unit 40a, and the passenger state detecting unit 50a are included in a second control unit 60a.

A driver state monitoring unit 70a executes a process of determining whether a driver is in a drowsy driving state, whether the driver is in an inattentive driving state, or the like by using the results of the line-of-sight detecting process by the line-of-sight detecting unit 51, the mouth-opening degree detecting process by the mouth-opening degree detecting unit 52, and the face orientation detecting process by the face orientation detecting unit 53. The driver state monitoring unit 70a further executes a process of determining whether the driver is in the incapable-of-driving state using the result of the complexion detecting process by the complexion detecting unit 54 and other processes.

The correction parameter setting unit 30a, the image correcting unit 40a, and the passenger state detecting unit 50a are included in the passenger state detection device 100a as the main part thereof. In addition, the first control unit 10a, the second control unit 60a, and the driver state monitoring unit 70a are included in the control device 200a as the main part thereof.

Since a hardware configuration of the main part of the control device 200a is similar to that described with reference to FIG. 3 in the first embodiment, illustration and description thereof are omitted. That is, the functions of the first control unit 10a, the second control unit 60a, and the driver state monitoring unit 70a may be implemented by the processor 81 and the memory 82, or may be implemented by the processing circuit 83.

Figure 12A:
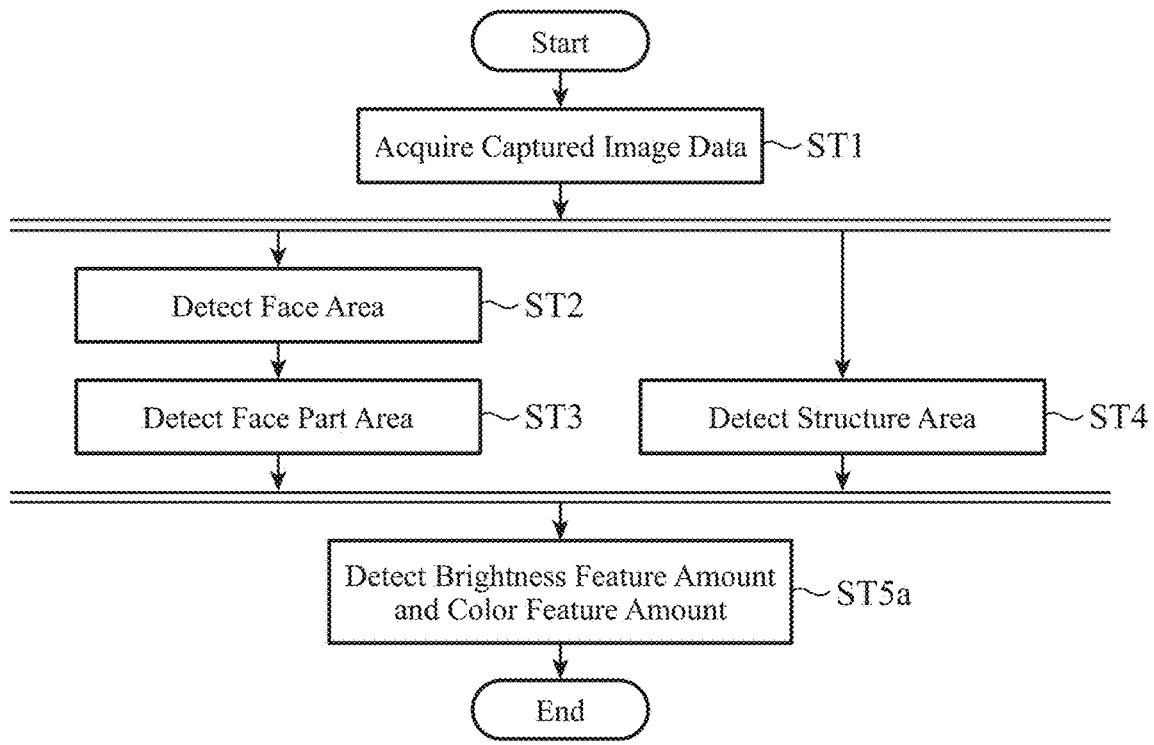
FIG. 12A is a flowchart illustrating the operation of the control device including the passenger state detection device according to the second embodiment.

Next, with reference to a flowchart of FIG. 12A, the operation of the control device 200a will be described focusing on the operation of the first control unit 10a.

First, the image data acquiring unit 11 executes the process of step ST1. Next, the face area detecting unit 12 executes the process of step ST2, and the face part area detecting unit 13 executes the process of step ST3. In addition, the structure area detecting unit 14 executes the process of step ST4. Since the contents of the processes of steps ST1 to ST4 are similar to those that are described with reference to FIG. 4A in the first embodiment, detailed description is omitted.

Next in step ST5a, the feature amount detecting unit 15a detects the brightness feature amount and the color feature amount in the face part area using the face part image data output by the face part area detecting unit 13 in step ST3. The feature amount detecting unit 15a also detects the brightness feature amount and the color feature amount in the structure area using the structure image data output by the structure area detecting unit 14 in step ST4.

Next, with reference to flowcharts of FIG. 12B to FIG. 12E, the operation of the control device 200a will be described focusing on the operation of the second control unit 60a. The control device 200a executes the processes illustrated in each of FIG. 12B to FIG. 12E subsequent to the process illustrated in FIG. 12A.

Figure 12B:
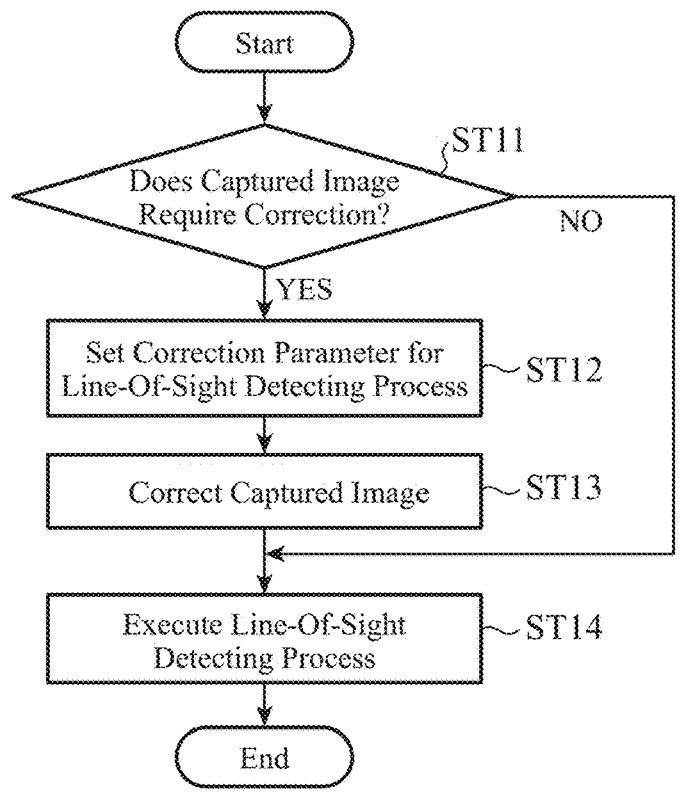
FIG. 12B is a flowchart illustrating another operation of the control device including the passenger state detection device according to the second embodiment.
Figure 12C:
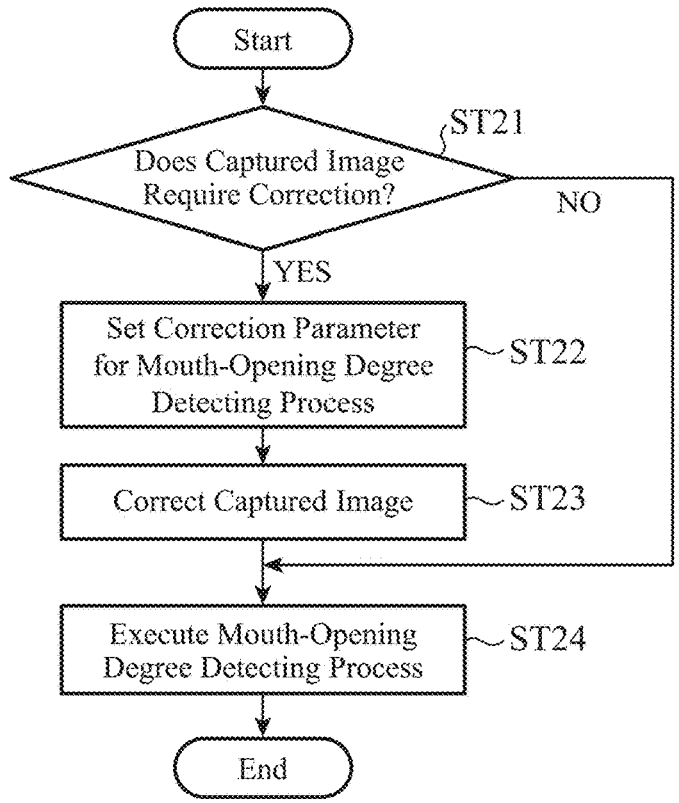
FIG. 12C is a flowchart illustrating still another operation of the control device including the passenger state detection device according to the second embodiment.
Figure 12D:
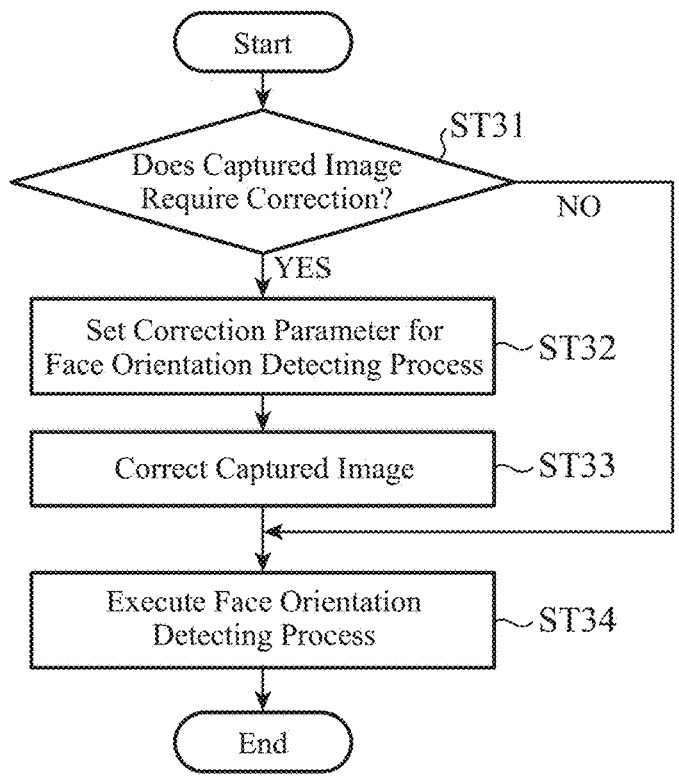
FIG. 12D is a flowchart illustrating yet another operation of the control device including the passenger state detection device according to the second embodiment.
Figure 12E:
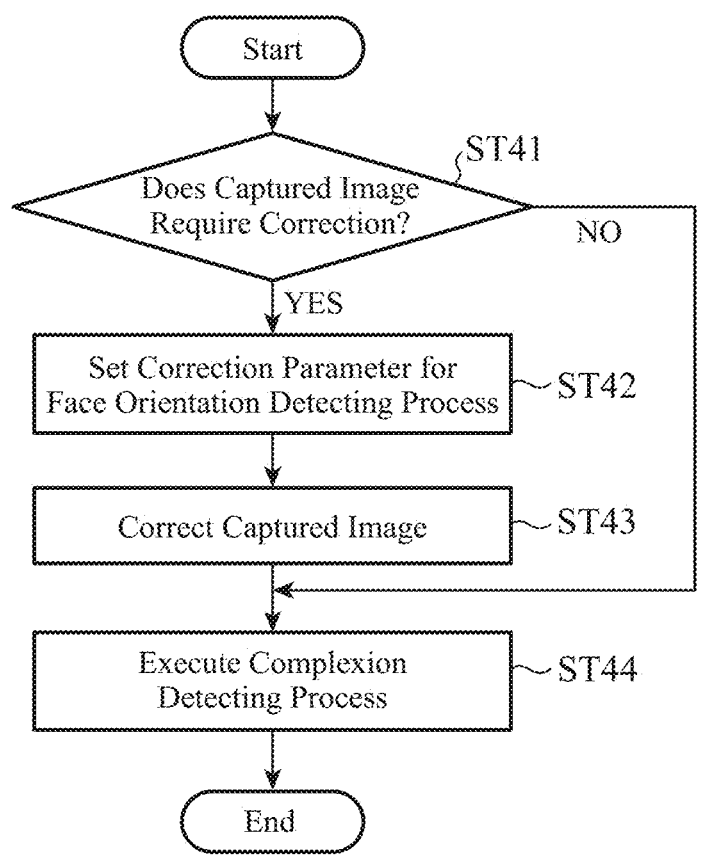
FIG. 12E is a flowchart illustrating still yet another operation of the control device including the passenger state detection device according to the second embodiment.

Note that the contents of the processes of steps ST11 to ST14 illustrated in FIG. 12B are similar to those that are described with reference to FIG. 4B in the first embodiment, detailed description is omitted. The contents of the processes of steps ST21 to ST24 illustrated in FIG. 12C are similar to those that are described with reference to FIG. 4C in the first embodiment, detailed description is omitted. The contents of the processes of steps ST31 to ST34 illustrated in FIG. 12D are similar to those that are described with reference to FIG. 4D in the first embodiment, detailed description is omitted.

The fourth correction necessity determining unit 24 determines the necessity of correction of the captured image in the complexion detecting process in step ST41 using the color feature amount detected by the feature amount detecting unit 15a in step ST5a. Since a specific example of the determination method by the fourth correction necessity determining unit 24 is as described above, description thereof will not be repeated.

If the fourth correction necessity determining unit 24 determines that the captured image needs to be corrected (step ST41 "YES"), the fourth correction parameter setting unit 34 sets a correction parameter for the complexion detecting process in step ST42 using the color feature amount detected by the feature amount detecting unit 15a in step ST5a. Next, in step ST43, the fourth image correcting unit 44 corrects the captured image indicated by the captured image data using the correction parameter set by the fourth correction parameter setting unit 34 in step ST42. Next, in step ST44, the complexion detecting unit 54 executes the complexion detecting process using the captured image that is corrected by the fourth image correcting unit 44 in step ST43.

On the other hand, when the fourth correction necessity determining unit 24 determines that the captured image does not need to be corrected (step ST41 "NO"), the complexion detecting unit 54 executes the complexion detecting process using the captured image indicated by the captured image data (i.e. the captured image before correction) in step ST44.

Since a specific example of the method of correcting the captured image by the fourth image correcting unit 44 is as described above, description thereof will not be repeated. Since a specific example of the method of setting a correction parameter by the fourth correction parameter setting unit 34 is as described above, description thereof will not be repeated. Since a specific example of the complexion detecting process is as described above, description thereof will not be repeated.

As described above, the passenger state detection device 100a sets a correction parameter for each of the detection items in the passenger state detecting process including the multiple detection items, and corrects the captured image for each of the detection items. As a result, the accuracy of passenger state detecting process including the plurality of detection items can be improved. In addition, it is possible to improve the accuracy of driver monitoring using the result of the passenger state detecting process.

In particular, using the color feature amount allows the accuracy to be improved in the complexion detecting process. As a result, it is possible to improve the accuracy of the process of determining whether the driver is in the incapable-of-driving state.

Note that a determination method by the fourth correction necessity determining unit 24 is not limited to the above specific example. The method of setting the correction parameter by the fourth correction parameter setting unit 34 is not limited to the above specific example. The method of correcting the captured image by the fourth image correcting unit 44 is not limited to the above specific example.

The necessity determination (i.e., process of step ST41) by the fourth correction necessity determining unit 24 may be executed for every frame, or may be executed for every predetermined number of frames. In a case where the necessity determination is executed for every predetermined number of frames, correction of a frame on which no necessity determination is executed depends on a result of the most recent necessity determination (and the most recent correction parameters).

Figure 13:
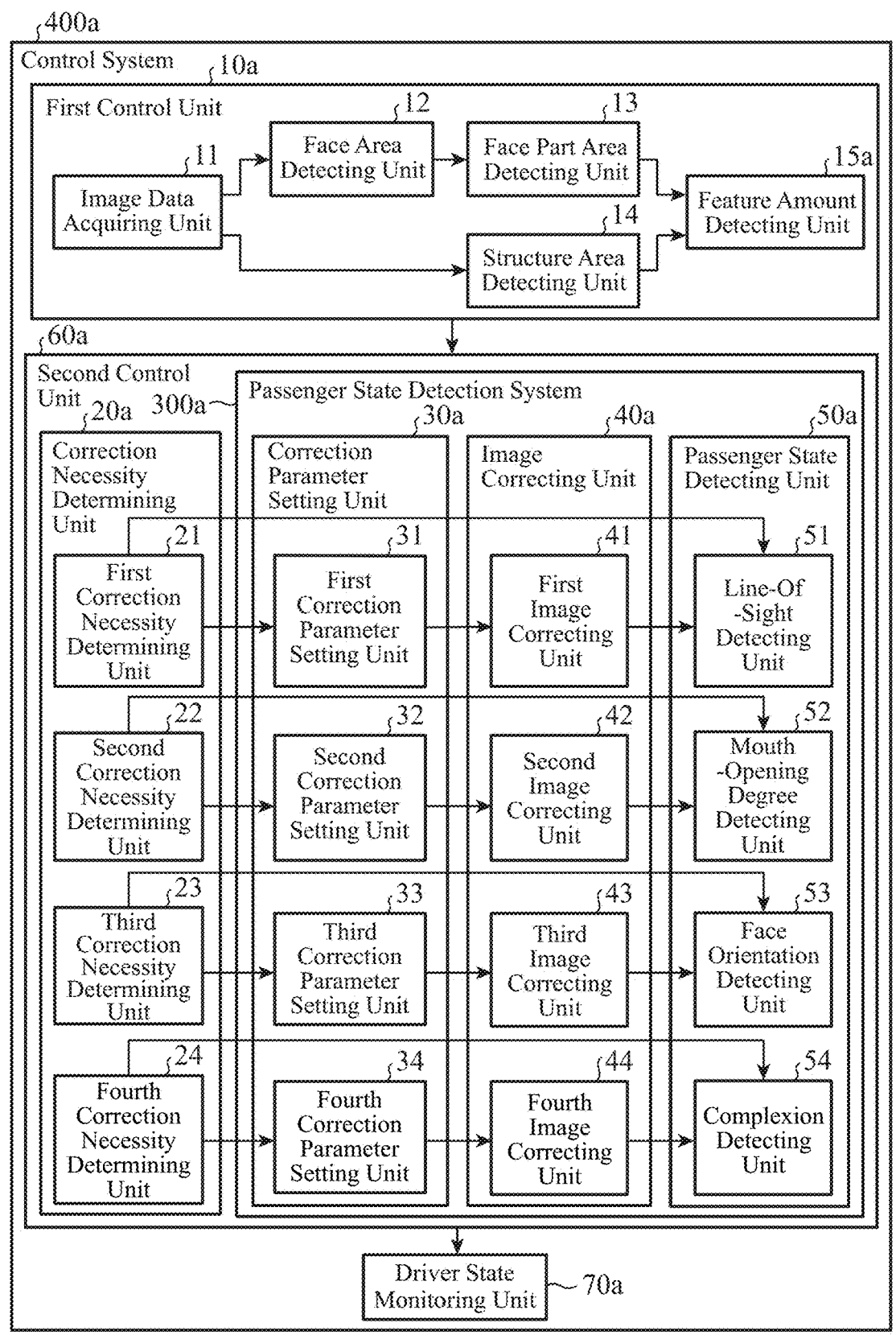
FIG. 13 is a block diagram illustrating the main part of a control system including a passenger state detection system according to the second embodiment.

Alternatively, the correction parameter setting unit 30a, the image correcting unit 40a, and the passenger state detecting unit 50a may be included in a passenger state detection system 300a as the main part thereof as illustrated in FIG. 13. Moreover, the first control unit 10a, the second control unit 60a, and the driver state monitoring unit 70a may be included in a control system 400a as the main part thereof.

Since a system configuration of the main part of the control system 400a is similar to that described with reference to FIG. 7 in the first embodiment, illustration and description thereof are omitted. That is, it suffices to implement the functions of the first control unit 10a, the second control unit 60a, and the driver state monitoring unit 70a by cooperation of any two or more of the in-vehicle information device 91, the portable information terminal 92, or the server device 93.

Alternatively, the correction parameter setting unit 30a and the image correcting unit 40a may be included in a passenger state detection device 100a as the main part thereof similarly to the example illustrated in FIG. 8. Alternatively, the correction parameter setting unit 30a and the image correcting unit 40a may be included in a passenger state detection system 300a as the main part thereof similarly to the example illustrated in FIG. 9.

In addition, the control device 200a can adopt various modifications similar to those described in the first embodiment, that is, various modifications similar to the control device 200. Moreover, the control system 400a can employ various modifications similar to those described in the first embodiment, that is, various modifications similar to the control system 400.

As described above, the passenger state detection device 100a according to the second embodiment includes: the correction parameter setting unit 30a for setting a correction parameter for a captured image captured by the camera 2a for capturing the vehicle interior for each of the detection items in the passenger state detecting process including the multiple detection items using at least one of the feature amount in the face part area corresponding to the passenger's face part in the captured image or the feature amount in the structure area that corresponds to a structure in the vehicle interior in the captured image; and the image correcting unit 40a for correcting the captured image for each of the detection items in the passenger state detecting process using the correction parameter set by the correction parameter setting unit 30a. As a result, the accuracy of passenger state detecting process including the plurality of detection items can be improved. In addition, it is possible to improve the accuracy of driver monitoring using the result of the passenger state detecting process.

The passenger state detection device 100a further includes the passenger state detecting unit 50a that executes the passenger state detecting process for each detection item using the captured image corrected by the image correcting unit 40a. As a result, for example the accuracy of the complexion detecting process can be improved. As a result, for example, it is possible to improve the accuracy of the process of determining whether the driver is in the incapable-of-driving state.

Third Embodiment

Figure 14:
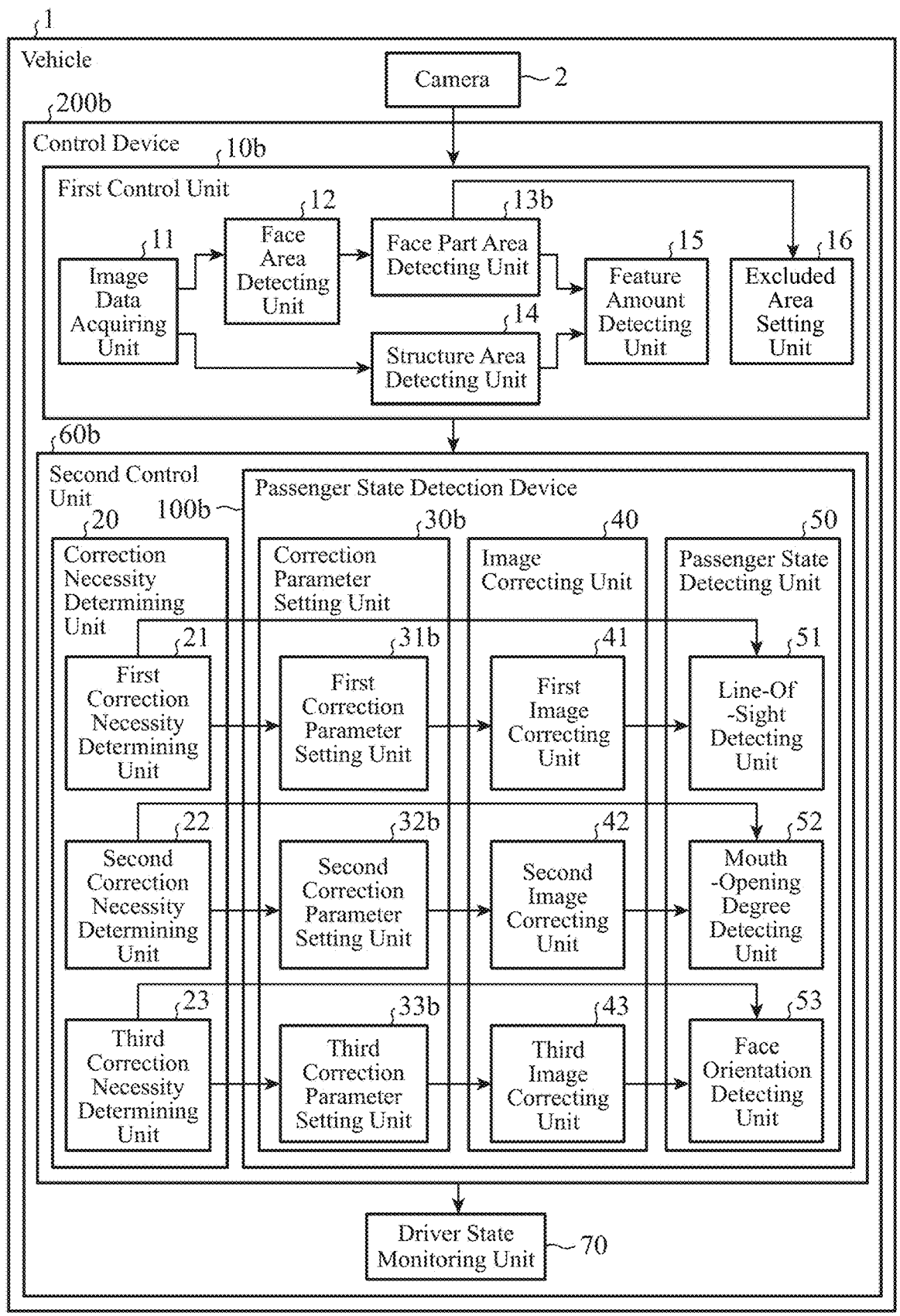
FIG. 14 is a block diagram illustrating the main part of a control device including a passenger state detection device according to a third embodiment.

FIG. 14 is a block diagram illustrating the main part of a control device including a passenger state detection device according to a third embodiment. With reference to FIG. 14, a passenger state detection device 100b according to the third embodiment will be described focusing on an example in which the passenger state detection device 100b is included in a control device 200b in a vehicle 1. Note that in FIG. 14 the same symbol is given to a block similar to that illustrated in FIG. 1, and description thereof is omitted.

A face part area detecting unit 13b detects a face part area in a captured image using face image data output by the face area detecting unit 12. The method of detecting the face part area by the face part area detecting unit 13b is similar to the method of detecting the face part area by the face part area detecting unit 13 illustrated in FIG. 1, and thus detailed description is omitted.

Here, as described in the first embodiment, a face part area includes multiple areas that correspond to multiple face parts (hereinafter, simply referred to as "multiple areas"). The face part area detecting unit 13b outputs information indicating an area, detection of which has failed, among the multiple areas (hereinafter referred to as "detection failure area") to an excluded area setting unit 16.

The face part area detecting unit 13b also has a function of calculating the reliability of detection (hereinafter, simply referred to as "reliability") for each of areas that are successfully detected among the multiple areas. The face part area detecting unit 13b outputs, to the excluded area setting unit 16, information indicating an area having a reliability lower than a predetermined value (hereinafter referred to as "low reliability area") among the multiple areas.

Specifically, for example, the face part area detecting unit 13b generates a score map in an algorithm such as model fitting or EBGM. The face part area detecting unit 13b calculates a matching score using the generated score map. The face part area detecting unit 13b uses the value of the calculated matching score as the reliability.

For example, if there is a face part that is shielded by a shield (for example, a passenger's hand) in the captured image, it is probable that an area corresponding to the shielded face part among the multiple areas becomes a detection failure area or a low reliability area. Hereinafter, the shielded area is referred to as "shielded area."

Meanwhile, for example in a case where a camera 2 includes an infrared camera, it is probable that an area where so-called "overexposure" occurs among the multiple areas becomes a detection failure area or a low reliability area. Note that, due to a face part that is shielded by the passenger's hand in the captured image, overexposure may occur in an area that corresponds to the shielded face part (that is, a shielded area). Hereinafter, an area in which overexposure is occurring is referred to as an "overexposure area."

For example in a case where the camera 2 includes a color camera, it is probable that an area where a so-called "black defect" is occurring among the multiple areas becomes a detection failure area or a low reliability area. Note that, due to a face part that is shielded by the passenger's hand in the captured image, a black defect may occur in an area that corresponds to the shielded face part (that is, a shielded area). Hereinafter, an area in which a black defect is occurring is referred to as a "black defect area."

The excluded area setting unit 16 sets an area whose feature amount is excluded from the setting of the correction parameters by the correction parameter setting unit 30b (hereinafter referred to as an "excluded area") using the information output from the face part area detecting unit 13b. Specifically, for example, the excluded area setting unit 16 sets a detection failure area and a low reliability area indicated by the information output by the face part area detecting unit 13b as excluded areas.

An image data acquiring unit 11, the face area detecting unit 12, the face part area detecting unit 13b, a structure area detecting unit 14, a feature amount detecting unit 15, and the excluded area setting unit 16 are included in a first control unit 10b.

When the first correction necessity determining unit 21 determines that the captured image needs to be corrected, a first correction parameter setting unit 31b uses the feature amount detected by the feature amount detecting unit 15 to set a correction parameter for the line-of-sight detecting process. Since the method of setting a correction parameter by the first correction parameter setting unit 31b is similar to the method of setting a correction parameter by the first correction parameter setting unit 31 illustrated in FIG. 1, detailed description thereof will be omitted. Note that the first correction parameter setting unit 31b sets a correction parameter using feature amounts in areas different from the excluded area among the multiple areas.

When the second correction necessity determining unit 22 determines that the captured image needs to be corrected, a second correction parameter setting unit 32b uses the feature amount detected by the feature amount detecting unit 15 to set a correction parameter for the mouth-opening degree detecting process. Since the method of setting a correction parameter by the second correction parameter setting unit 32b is similar to the method of setting a correction parameter by the second correction parameter setting unit 32 illustrated in FIG. 1, detailed description thereof will be omitted. Note that the second correction parameter setting unit 32b sets a correction parameter using feature amounts in areas different from the excluded area among the multiple areas.

When the third correction necessity determining unit 23 determines that the captured image needs to be corrected, a third correction parameter setting unit 33b uses the feature amount detected by the feature amount detecting unit 15 to set a correction parameter for the face orientation detecting process. Since the method of setting a correction parameter by the third correction parameter setting unit 33b is similar to the method of setting a correction parameter by the third correction parameter setting unit 33 illustrated in FIG. 1, detailed description thereof will be omitted. Note that the third correction parameter setting unit 33b sets a correction parameter using feature amounts in areas different from the excluded area among the multiple areas.

Figure 15A:
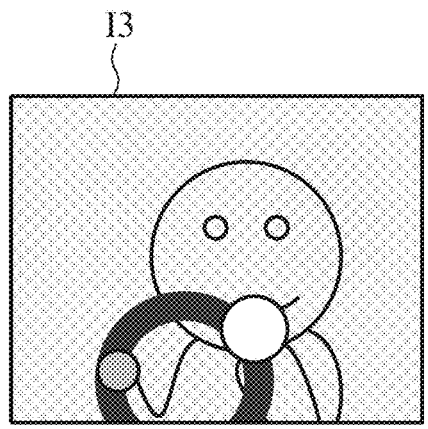
FIG. 15A is an explanatory diagram illustrating an example of a state in which overexposure occurs in a mouth area.

For example, it is assumed that a passenger's mouth is shielded by the passenger's hand in a captured image I3 as illustrated in FIG. 15A. It is also assumed that this caused overexposure in the mouth area. In this case, the mouth area is a detection failure area or a low reliability area. The excluded area setting unit 16 sets the mouth area as an excluded area.

Figure 15B:
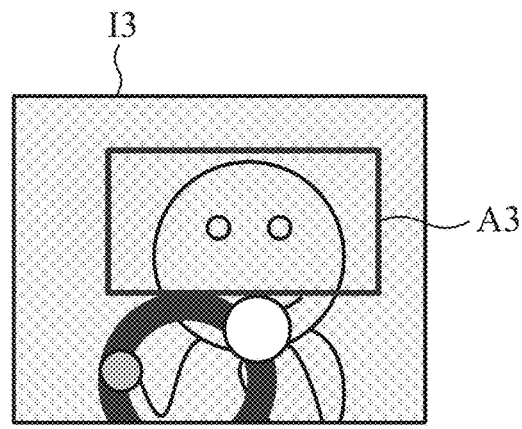
FIG. 15B is an explanatory diagram illustrating an example of an area used for setting a correction parameter in the state illustrated in FIG. 15A.

Therefore, each of the first correction parameter setting unit 31b, the second correction parameter setting unit 32b, and the third correction parameter setting unit 33b sets a correction parameter using a feature amount in an area A3 different from the mouth area as illustrated in FIG. 15B. In the example illustrated in FIG. 15B, the area A3 includes the eye areas, the nose area, and an area that corresponds to the passenger's forehead.

The first correction parameter setting unit 31b, the second correction parameter setting unit 32b, and the third correction parameter setting unit 33b are included in a correction parameter setting unit 30b. The correction necessity determining unit 20, the correction parameter setting unit 30b, the image correcting unit 40, and the passenger state detecting unit 50 are included in a second control unit 60b.

The correction parameter setting unit 30b, the image correcting unit 40, and the passenger state detecting unit 50 are included in the passenger state detection device 100b as the main part thereof. In addition, the first control unit 10b, the second control unit 60b, and the driver state monitoring unit 70 are included in the control device 200b as the main part thereof.

Since a hardware configuration of the main part of the control device 200b is similar to that described with reference to FIG. 3 in the first embodiment, illustration and description thereof are omitted. That is, the functions of the first control unit 10b, the second control unit 60b, and the driver state monitoring unit 70 may be implemented by the processor 81 and the memory 82, or may be implemented by the processing circuit 83.

Figure 16:
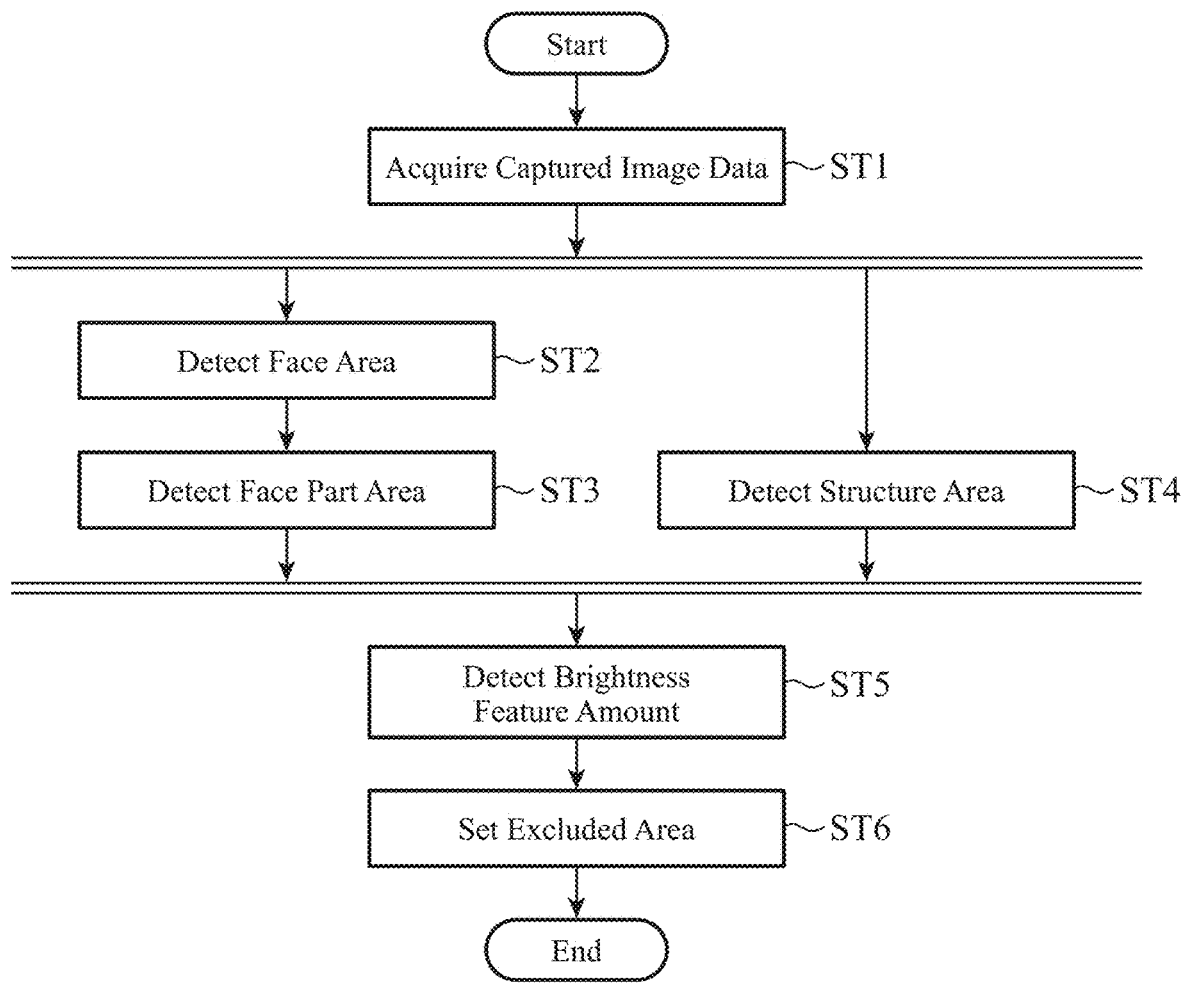
FIG. 16 is a flowchart illustrating the operation of the control device including the passenger state detection device according to the third embodiment.

Next, with reference to a flowchart of FIG. 16, the operation of the control device 200b will be described focusing on the operation of the first control unit 10b.

First, the image data acquiring unit 11 executes the process of step ST1. Next, the face area detecting unit 12 executes the process of step ST2, and the face part area detecting unit 13 executes the process of step ST3. In addition, the structure area detecting unit 14 executes the process of step ST4. Next, the feature amount detecting unit 15 executes the process of step ST5. Since the contents of the processes of steps ST1 to ST5 are similar to those that are described with reference to FIG. 4A in the first embodiment, detailed description is omitted.

Next, in step ST6, the excluded area setting unit 16 sets an excluded area using the information output by the face part area detecting unit 13b. Specifically, for example, the excluded area setting unit 16 sets a detection failure area and a low reliability area indicated by the information output by the face part area detecting unit 13b as excluded areas.

Since the operation of the second control unit 60b is similar to that described with reference to the FIGS. 4B to 4D in the first embodiment, illustration and description thereof are omitted. Note that feature amounts in areas different from the excluded area among the multiple areas are used when the correction parameter setting unit 30b sets a correction parameter (that is, in each of steps ST12, ST22, and ST32). This excluded area is set by the excluded area setting unit 16 in step ST6.

As described above, in the passenger state detection device 100b, feature amounts in the detection failure area and the low reliability area are excluded from the setting of the correction parameters by the correction parameter setting unit 30b. This makes it possible to avoid setting the correction parameters on the basis of a feature amount in a shielded area, an overexposure area, a black defect area, or the like. As a result, the accuracy of the passenger state detecting process can be further improved. Moreover, the accuracy of driver monitoring using the result of the passenger state detecting process can be further improved.

In particular, using the brightness feature amount allows the accuracy to be further improved in the line-of-sight detecting process, the mouth-opening degree detecting process, and the face orientation detecting process. As a result, it is possible to further improve the accuracy of the process of determining whether the driver is in a drowsy state and the process of determining whether the driver is in an inattentive driving state.

The method of setting an excluded area by the excluded area setting unit 16 is not limited to the above specific examples.

For example, in a case where the camera 2 includes an infrared camera and the feature amount detecting unit 15 detects a brightness feature amount, the excluded area setting unit 16 may detect overexposure areas among the multiple areas using the brightness value indicated by the feature amount information. The feature amount detecting unit 15 may set the detected overexposure areas as excluded areas. Alternatively, the feature amount detecting unit 15 may determine a detection failure area and a low reliability area among the detected overexposure areas as shielded areas and set the areas that are determined as the shielded areas as excluded areas.

Further alternatively, for example in a case where the camera 2 includes a color camera and the feature amount detecting unit 15 detects a color feature amount, the excluded area setting unit 16 may detect black defect areas among the multiple areas using the color value indicated by the feature amount information. The feature amount detecting unit 15 may set the detected black defect areas as excluded areas. Alternatively, the feature amount detecting unit 15 may determine a detection failure area and a low reliability area among the detected black defect areas as shielded areas and set the areas that are determined as the shielded areas as excluded areas.

Alternatively, for example, the excluded area setting unit 16 may set at least one of the detection failure area and the low reliability area as an excluded area.

Figure 17:
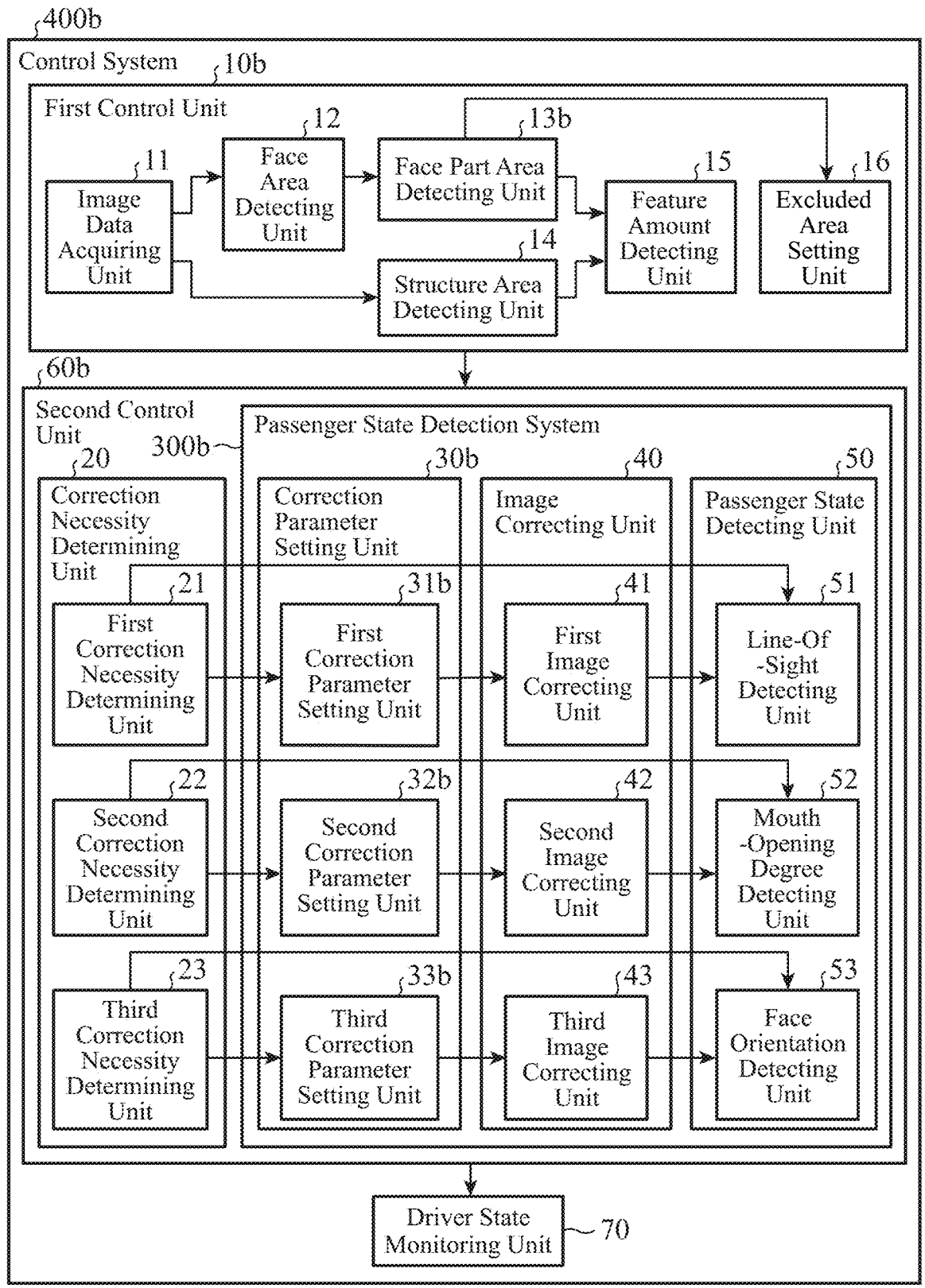
FIG. 17 is a block diagram illustrating the main part of a control system including a passenger state detection system according to the third embodiment.

Alternatively, the correction parameter setting unit 30b, the image correcting unit 40, and the passenger state detecting unit 50 may be included in a passenger state detection system 300b as the main part thereof as illustrated in FIG. 17. Moreover, the first control unit 10b, a second control unit 60b, and the driver state monitoring unit 70 may be included in a control system 400b as the main part thereof.

Since a system configuration of the main part of the control system 400b is similar to that described with reference to FIG. 7 in the first embodiment, illustration and description thereof are omitted. That is, it suffices to implement the functions of the first control unit 10b, the second control unit 60b, and the driver state monitoring unit 70 by cooperation of any two or more of the in-vehicle information device 91, the portable information terminal 92, or the server device 93.

Alternatively, the correction parameter setting unit 30b and the image correcting unit 40 may be included in a passenger state detection device 100b as the main part thereof similarly to the example illustrated in FIG. 8. Alternatively, the correction parameter setting unit 30b and the image correcting unit 40 may be included in a passenger state detection system 300b as the main part thereof similarly to the example illustrated in FIG. 9.

In addition, the control device 200b can adopt various modifications similar to those described in the first embodiment, that is, various modifications similar to the control device 200. Moreover, the control system 400b can employ various modifications similar to those described in the first embodiment, that is, various modifications similar to the control system 400.

As described above, in the passenger state detection device 100b of the third embodiment, a face part area includes multiple areas corresponding to multiple face parts, and the correction parameter setting unit 30b sets the correction parameters for the captured image using feature amounts in areas different from a detection failure area among the multiple areas. As a result, the accuracy of the passenger state detecting process can be further improved.

Moreover, the accuracy of driver monitoring using the result of the passenger state detecting process can be further improved.

Alternatively, in the passenger state detection device 100b, a face part area includes multiple areas corresponding to multiple face parts, and the correction parameter setting unit 30b sets the correction parameters for the captured image using feature amounts in areas different from a low reliability area among the multiple areas. As a result, the accuracy of the passenger state detecting process can be further improved. Moreover, the accuracy of driver monitoring using the result of the passenger state detecting process can be further improved.

Fourth Embodiment

Figure 18:
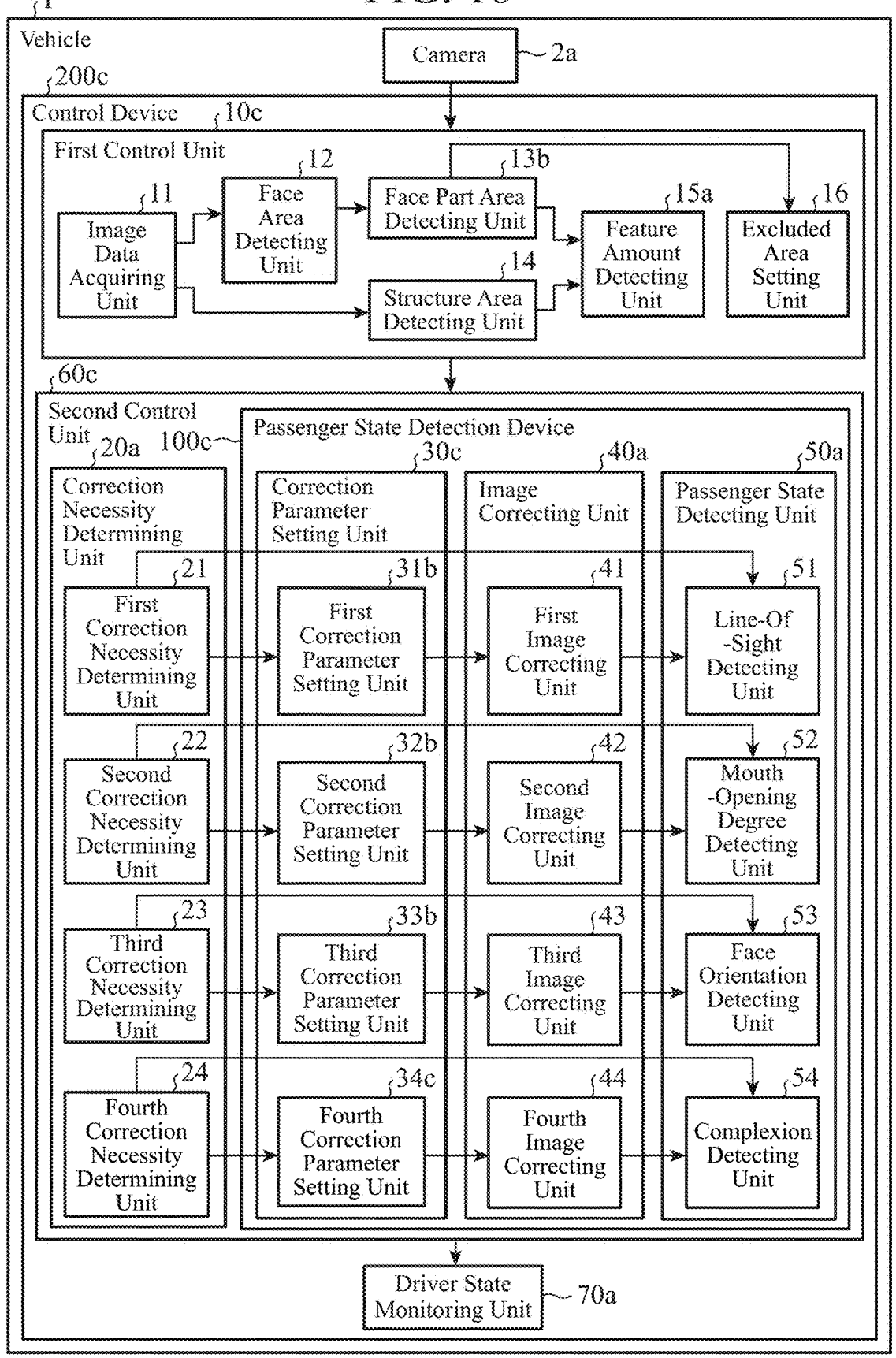
FIG. 18 is a block diagram illustrating the main part of a control device including a passenger state detection device according to a fourth embodiment.

FIG. 18 is a block diagram illustrating the main part of a control device including a passenger state detection device according to a fourth embodiment. With reference to FIG. 18, a passenger state detection device 100c according to the fourth embodiment will be described focusing on an example in which the passenger state detection device 100c is included in a control device 200c in a vehicle 1.

Note that in FIG. 18 the same symbol is given to a block similar to that illustrated in FIG. 10, and description thereof is omitted. Note that in FIG. 18 the same symbol is given to a block similar to that illustrated in FIG. 14, and description thereof is omitted.

As illustrated in FIG. 18, an image data acquiring unit 11, a face area detecting unit 12, the face part area detecting unit 13b, the structure area detecting unit 14, a feature amount detecting unit 15a, and an excluded area setting unit 16 are included in a first control unit 10c.

When a fourth correction necessity determining unit 24 determines that a captured image needs to be corrected, a fourth correction parameter setting unit 34c uses a feature amount detected by the feature amount detecting unit 15a to set a correction parameter for complexion detecting process. Since the method of setting a correction parameter by the fourth correction parameter setting unit 34c is similar to the method of setting a correction parameter by the fourth correction parameter setting unit 34 illustrated in FIG. 10, detailed description thereof will be omitted. Note that the fourth correction parameter setting unit 34c sets a correction parameter using feature amounts in areas different from the excluded area among the multiple areas. This excluded area is set by the excluded area setting unit 16.

A first correction parameter setting unit 31b, a second correction parameter setting unit 32b, a third correction parameter setting unit 33b, and the fourth correction parameter setting unit 34c are included in a correction parameter setting unit 30c. The correction necessity determining unit 20a, the correction parameter setting unit 30c, the image correcting unit 40a, and the passenger state detecting unit 50a are included in a second control unit 60c.

The correction parameter setting unit 30c, the image correcting unit 40a, and the passenger state detecting unit 50a are included in the passenger state detection device 100c as the main part thereof. In addition, the first control unit 10c, the second control unit 60c, and the driver state monitoring unit 70a are included in the control device 200c as the main part thereof.

Since a hardware configuration of the main part of the control device 200c is similar to that described with reference to FIG. 3 in the first embodiment, illustration and description thereof are omitted. That is, the functions of the first control unit 10c, the second control unit 60c, and the driver state monitoring unit 70a may be implemented by the processor 81 and the memory 82, or may be implemented by the processing circuit 83.

Figure 19:
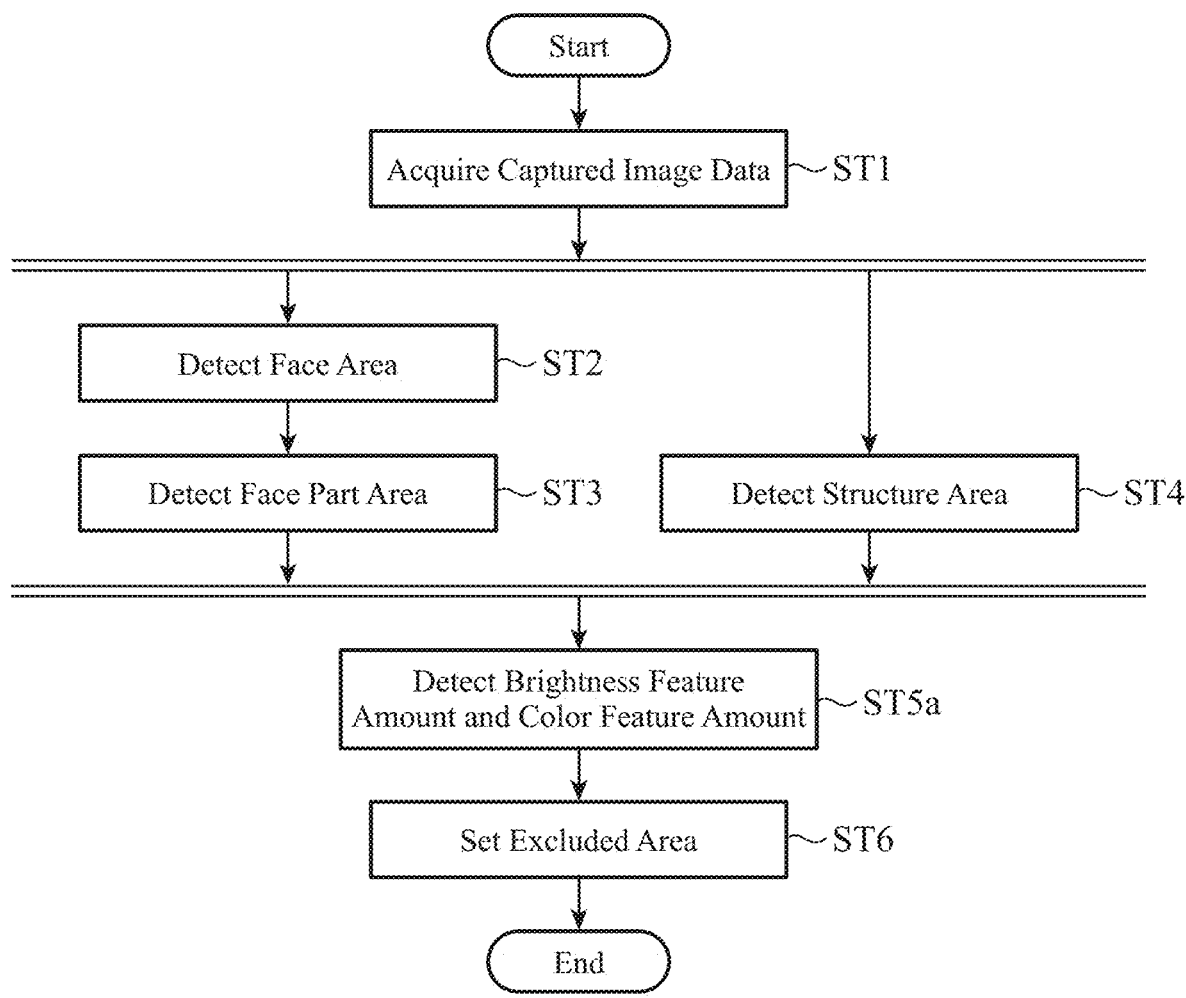
FIG. 19 is a flowchart illustrating the operation of the control device including the passenger state detection device according to the fourth embodiment.

The flowchart of FIG. 19 illustrates the operation of the first control unit 10c. Since the contents of the processes of steps ST1 to ST4 are similar to those that are described with reference to FIG. 4A in the first embodiment, detailed description is omitted. Since the contents of the process of step ST5a are similar to those that are described with reference to FIG. 12A in the second embodiment, detailed description is omitted. Since the contents of the process of step ST6 are similar to those that are described with reference to FIG. 16 in the third embodiment, detailed description is omitted.

Since the operation of the second control unit 60c is similar to that described with reference to FIGS. 12B to 12E in the second embodiment, illustration and description thereof are omitted. Note that feature amounts in areas different from the excluded area among the multiple areas are used when the correction parameter setting unit 30c sets a correction parameter (that is, in each of steps ST12, ST22, ST32, and ST42). This excluded area is set by the excluded area setting unit 16 in step ST6.

As described above, in the passenger state detection device 100c, feature amounts in the detection failure area and the low reliability area are excluded from the setting of the correction parameters by the correction parameter setting unit 30c. This makes it possible to avoid setting the correction parameters on the basis of a feature amount in a shielded area, an overexposure area, a black defect area, or the like. As a result, the accuracy of the passenger state detecting process can be further improved. Moreover, the accuracy of driver monitoring using the result of the passenger state detecting process can be further improved.

In particular, using the color feature amount allows the accuracy to be further improved in the complexion detecting process. As a result, it is possible to further improve the accuracy of the process of determining whether the driver is in the incapable-of-driving state.

Figure 20:
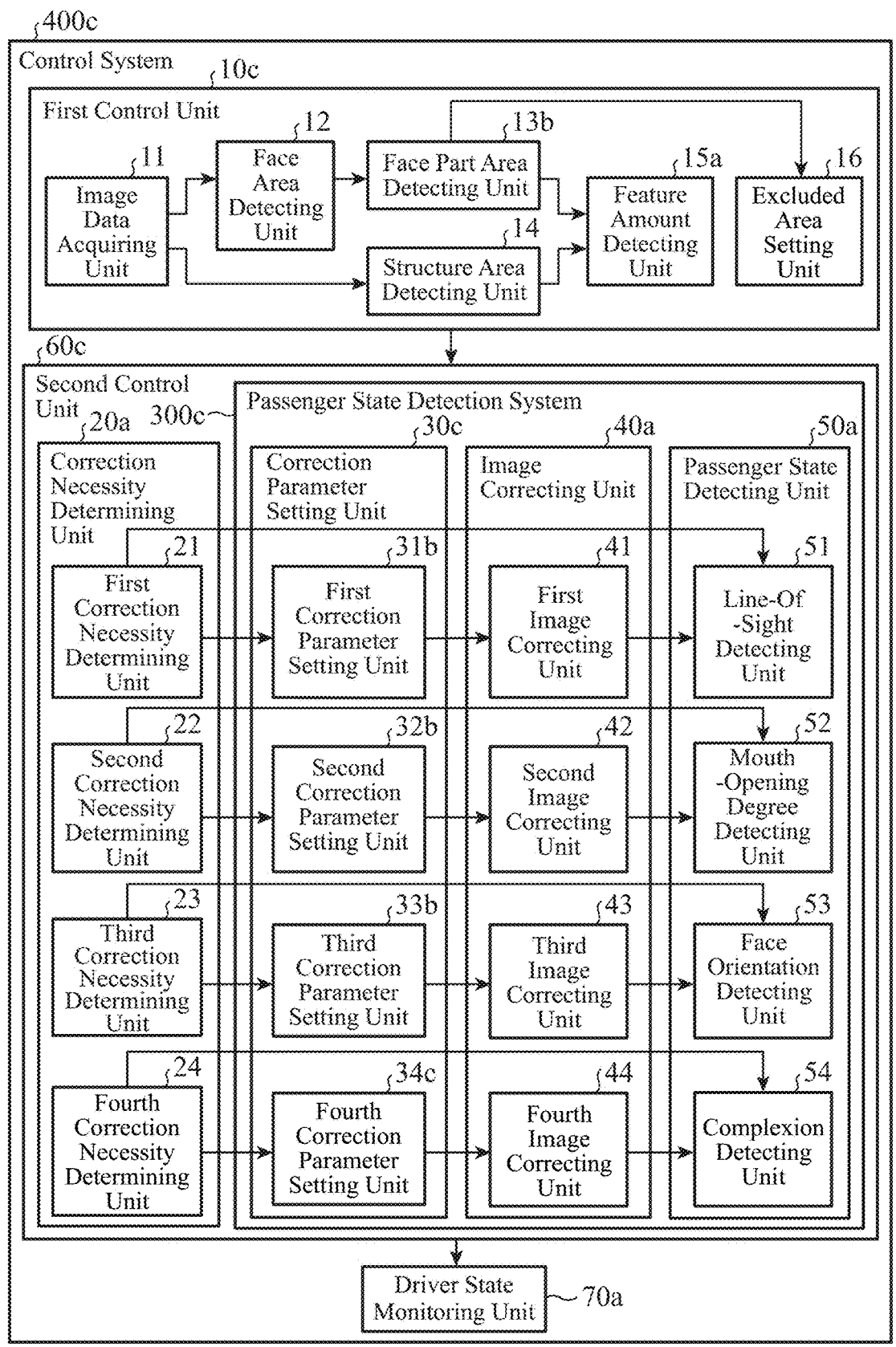
FIG. 20 is a block diagram illustrating the main part of a control system including a passenger state detection system according to the fourth embodiment.

Note that the correction parameter setting unit 30c, the image correcting unit 40a, and the passenger state detecting unit 50a may be included in a passenger state detection system 300c as the main part thereof as illustrated in FIG. 20. Moreover, the first control unit 10c, the second control unit 60c, and the driver state monitoring unit 70a may be included in a control system 400c as the main part thereof.

Since a system configuration of the main part of the control system 400c is similar to that described with reference to FIG. 7 in the first embodiment, illustration and description thereof are omitted. That is, it suffices to implement the functions of the first control unit 10c, the second control unit 60c, and the driver state monitoring unit 70a by cooperation of any two or more of the in-vehicle information device 91, the portable information terminal 92, or the server device 93.

Alternatively, the correction parameter setting unit 30c and the image correcting unit 40a may be included in a passenger state detection device 100c as the main part thereof similarly to the example illustrated in FIG. 8. Alternatively, the correction parameter setting unit 30c and the image correcting unit 40a may be included in a passenger state detection system 300c as the main part thereof similarly to the example illustrated in FIG. 9.

In addition, the control device 200c can adopt various modifications similar to those described in the first to third embodiments, that is, various modifications similar to the control devices 200, 200a, and 200b. Moreover, the control system 400c can employ various modifications similar to those described in the first to third embodiments, that is, various modifications similar to the control systems 400, 400a, and 400b.

As described above, in the passenger state detection device 100c of the fourth embodiment, a face part area includes multiple areas corresponding to multiple face parts, and the correction parameter setting unit 30c sets the correction parameters for the captured image using feature amounts in areas different from a detection failure area among the multiple areas. As a result, the accuracy of the passenger state detecting process can be further improved. Moreover, the accuracy of driver monitoring using the result of the passenger state detecting process can be further improved.

Alternatively, in the passenger state detection device 100c, a face part area includes multiple areas corresponding to multiple face parts, and the correction parameter setting unit 30c sets the correction parameters for the captured image using feature amounts in areas different from a low reliability area among the multiple areas. As a result, the accuracy of the passenger state detecting process can be further improved. Moreover, the accuracy of driver monitoring using the result of the passenger state detecting process can be further improved.

Note that the present invention may include a flexible combination of the respective embodiments, a modification of any component of the embodiments, or an omission of any component in the embodiments within the scope of the present invention.

INDUSTRIAL APPLICABILITY

A passenger state detection device of the present invention can be used for, for example, driver monitoring.

REFERENCE SIGNS LIST

1: vehicle, 2, 2a: camera, 10, 10a, 10b, 10c: first control unit, 11: image data acquiring unit, 12: face area detecting unit, 13, 13b: face part area detecting unit, 14: structure area detecting unit, 15, 15a: feature amount detecting unit, 16: excluded area setting unit, 20, 20a: correction necessity determining unit, 21: first correction necessity determining unit, 22: second correction necessity determining unit, 23: third correction necessity determining unit, 24: fourth correction necessity determining unit, 30, 30a, 30b, 30c: correction parameter setting unit, 31, 31b: first correction parameter setting unit, 32, 32b: second correction parameter setting unit, 33, 33b: third correction parameter setting unit, 34, 34c: fourth correction parameter setting unit, 40, 40a: image correcting unit, 41: first image correcting unit, 42: second image correcting unit, 43: third image correcting unit, 44: fourth image correcting unit, 50, 50a: passenger state detecting unit, 51: line-of-sight detecting unit, 52: mouth-opening degree detecting unit, 53: face orientation detecting unit, 54: complexion detecting unit, 60, 60a, 60b, 60c: second control unit, 70, 70a: driver state monitoring unit, 81: processor, 82: memory, 83: processing circuit, 91: in-vehicle information device, 92: portable information terminal, 93: server device, 100, 100a, 100b, 100c: passenger state detection device, 200, 200a, 200b, 200c: control device, 300, 300a, 300b, 300c: passenger state detection system, 400, 400a, 400b, 400c: control system

The invention claimed is:

1. A passenger state detection device for detecting the state of a passenger using a plurality of detection items selected from a group including a line of sight of the passenger, a mouth-opening degree of the passenger, a face orientation of the passenger, a complexion of the passenger, or an eye-opening degree of the passenger, the passenger state detection device comprising:
processing circuitry configured to
receive a captured image from a camera for capturing a vehicle interior;
detect a face part area of the passenger's face included in the captured image;
detect a structure area that corresponds to a structure in the vehicle interior in the captured image
set, for each of the plurality of detection items, a respective correction parameter for the captured image using at least one of a feature amount in the detected face part area or a feature amount in the detected structure area; and
correct the captured image for each of the plurality of detection items in the passenger state detecting process using the respective set correction parameter.

2. The passenger state detection device according to claim 1, wherein the face part area includes at least one of an area that corresponds to the passenger's eye, an area that corresponds to the passenger's nose, an area that corresponds to the passenger's mouth, or an area that corresponds to the passenger's cheek.

3. The passenger state detection device according to claim 1, wherein a feature amount used for setting the correction parameter includes at least one of a brightness feature amount or a color feature amount.

4. The passenger state detection device according to claim 1, wherein
the face part area includes multiple areas that correspond to multiple face parts, and
the processing circuitry sets the correction parameter for the captured image using a feature amount in an area different from a detection failure area among the multiple areas.

5. The passenger state detection device according to claim 1, wherein
the face part area includes multiple areas that correspond to multiple face parts, and
the processing circuitry sets the correction parameter for the captured image using a feature amount in an area different from a low reliability area among the multiple areas.

6. The passenger state detection device according to claim 1, wherein the passenger includes a driver, and
a result of the passenger state detecting process is used in at least one of a process of determining whether the driver is in a drowsy driving state, a process of determining whether the driver is in an inattentive driving state, or a process of determining whether the driver is in an incapable-of-driving state.

7. A passenger state detection system for detecting the state of a passenger using a plurality of detection items selected from a group including a line of sight of the passenger, a mouth-opening degree of the passenger, a face orientation of the passenger, a complexion of the passenger, or an eye-opening degree of the passenger, the passenger state detection system comprising:
processing circuitry configured to
receive a captured image from a camera for capturing a vehicle interior;
detect a face part area of the passenger's face included in the captured image;
detect a structure area that corresponds to a structure in the vehicle interior in the captured image;
set, for each of the plurality of detection items, a respective correction parameter for the captured image using at least one of a feature amount in the detected face part area or a feature amount in the detected structure area; and
correct the captured image for each of the plurality of detection items in the passenger state detecting process using the respective set correction parameter.

8. A passenger state detection method for detecting the state of a passenger using a plurality of detection items selected from a group including a line of sight of the passenger, a mouth-opening degree of the passenger, a face orientation of the passenger, a complexion of the passenger, or an eye-opening degree of the passenger, the passenger state detection method comprising:
receiving a captured image from a camera for capturing a vehicle interior;
detecting a face part area of the passenger's face included in the captured image;
detecting a structure area that corresponds to a structure in the vehicle interior in the captured image;
setting, for each of the plurality of detection items, a respective correction parameter for the captured image using at least one of a feature amount in the detected face part area or a feature amount in the detected structure area; and
correcting the captured image for each of the plurality of detection items in the passenger state detecting process using the respective set correction parameter.

* * * * *